US008643954B2

(12) United States Patent
Misaka

(10) Patent No.: US 8,643,954 B2
(45) Date of Patent: *Feb. 4, 2014

(54) ZOOM LENS AND PHOTOGRAPHING APPARATUS

(71) Applicant: Samsung Electronics Co., Ltd., Suwon-si (KR)

(72) Inventor: Makoto Misaka, Yokohama (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/775,588

(22) Filed: Feb. 25, 2013

(65) Prior Publication Data

US 2013/0169856 A1  Jul. 4, 2013

Related U.S. Application Data

(63) Continuation of application No. 12/972,304, filed on Dec. 17, 2010, now Pat. No. 8,385,002.

(30) Foreign Application Priority Data

Dec. 17, 2009  (JP) ................................. 2009-286705
Nov. 29, 2010  (KR) ........................ 10-2010-0119789

(51) Int. Cl.
 *G02B 15/14* (2006.01)

(52) U.S. Cl.
 USPC .......................................... 359/684; 359/676

(58) Field of Classification Search
 CPC ............................ G02B 15/173; G02B 27/646
 USPC ................... 348/335, 340; 359/676, 683, 684
 See application file for complete search history.

(56) References Cited

U.S. PATENT DOCUMENTS

| 7,643,224 B2 * | 1/2010 | Watanabe ...................... 359/690 |
| 8,004,585 B2 | 8/2011 | Miyazaki et al. |
| 2009/0174949 A1 | 7/2009 | Watanabe |

FOREIGN PATENT DOCUMENTS

| JP | 05-142475 A | 6/1993 |
| JP | 06-075167 A | 3/1994 |
| JP | 10-133109 A | 5/1998 |
| JP | 10-133111 A | 5/1998 |
| JP | 10-133112 A | 5/1998 |
| JP | 11-295597 A | 10/1999 |
| JP | 2001091833 A | 4/2001 |
| JP | 2004212512 A | 7/2004 |
| JP | 2005107202 A | 4/2005 |
| JP | 2009198722 A | 9/2009 |
| JP | 2009251118 A | 10/2009 |

OTHER PUBLICATIONS

Office Action issued in related application JP2009-286705, Oct. 22, 2013, 4 pages.

* cited by examiner

*Primary Examiner* — David N Spector
(74) *Attorney, Agent, or Firm* — Drinker Biddle & Reath LLP

(57) ABSTRACT

A zoom lens and a photographing apparatus including the same. The zoom lens includes a first lens group having a positive refractive power, a second lens group having a negative refractive power, and an additional lens grouping having a positive refractive power, which are sequentially arranged from an object side, wherein the additional lens grouping comprises a third lens group having a positive refractive power.

17 Claims, 29 Drawing Sheets

FIG. 1
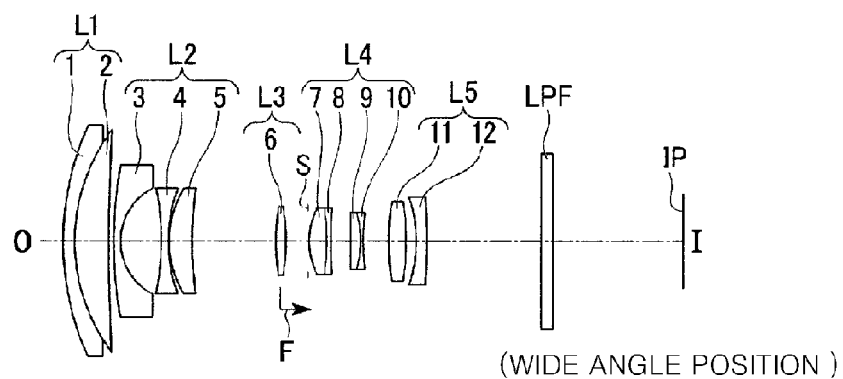
(WIDE ANGLE POSITION)
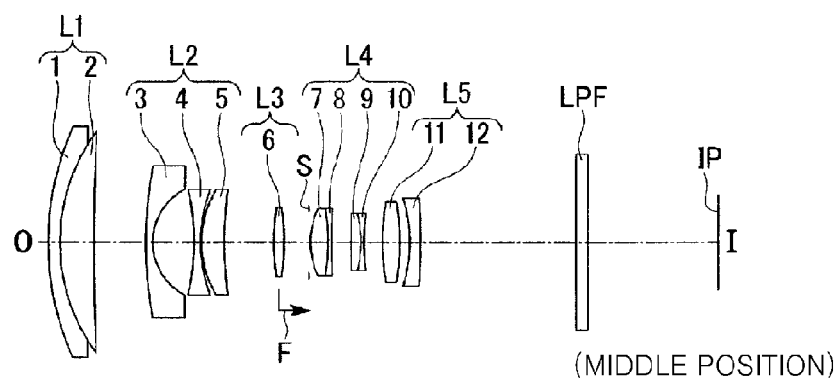
(MIDDLE POSITION)
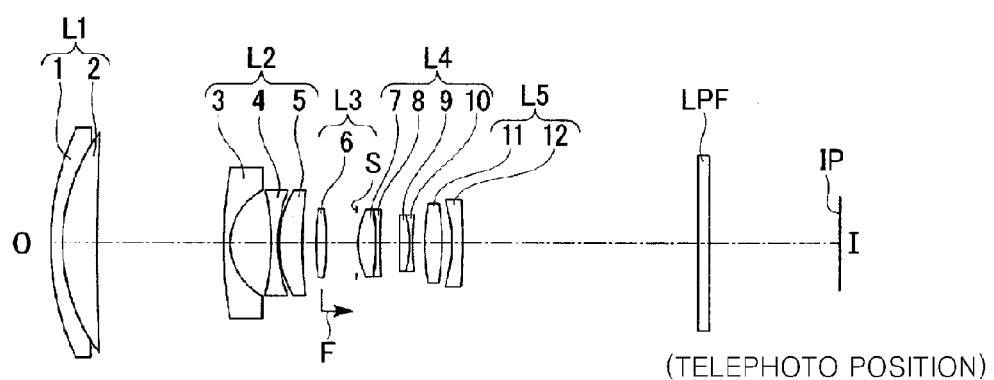
(TELEPHOTO POSITION)

FIG. 2
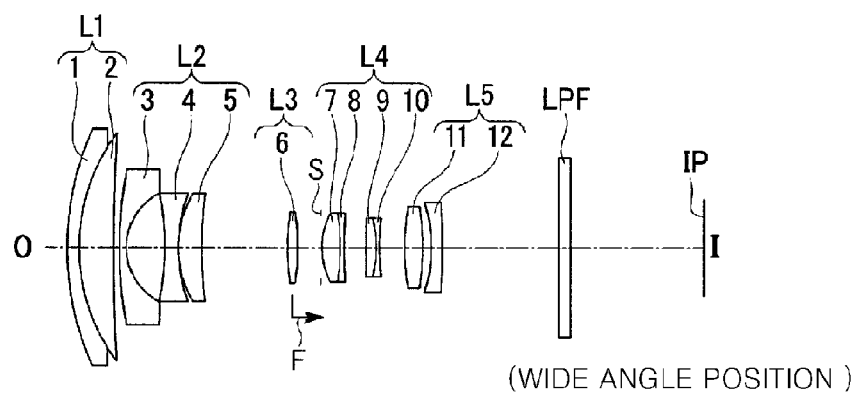
(WIDE ANGLE POSITION)
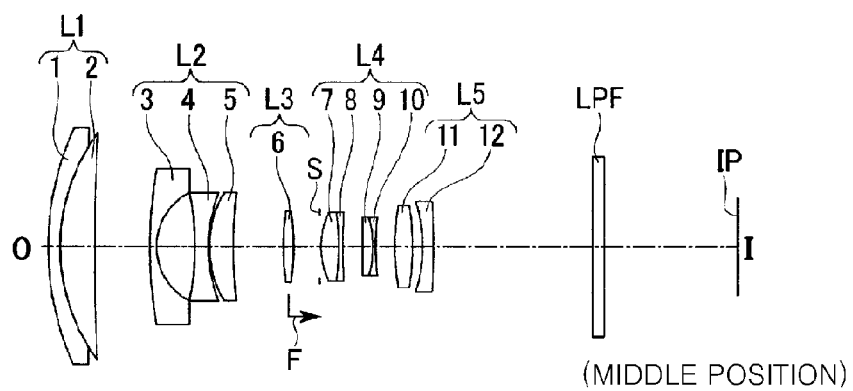
(MIDDLE POSITION)
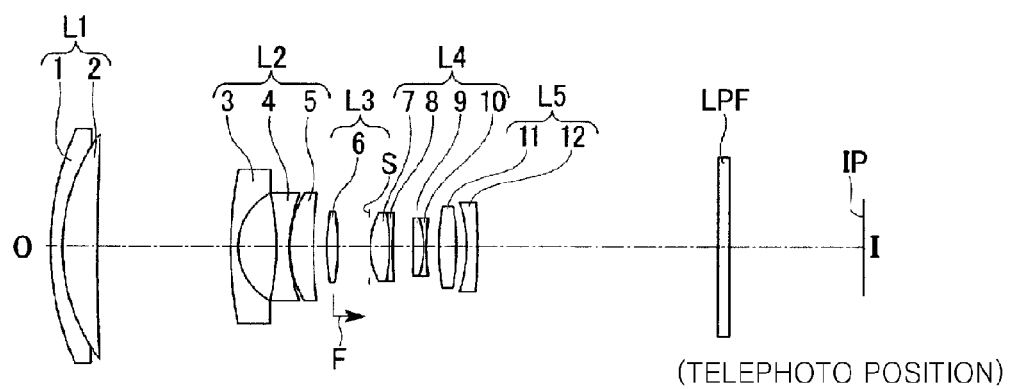
(TELEPHOTO POSITION)

FIG. 9
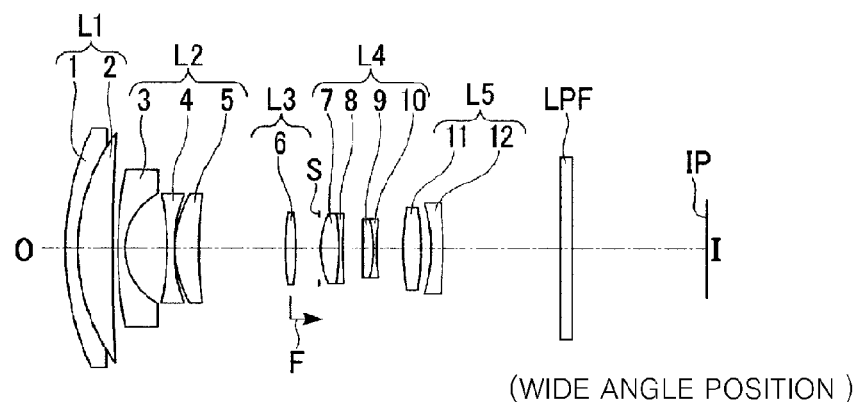
(WIDE ANGLE POSITION)
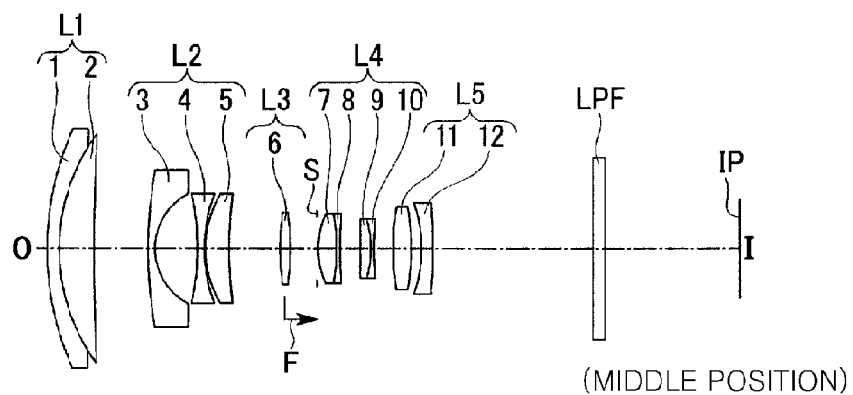
(MIDDLE POSITION)
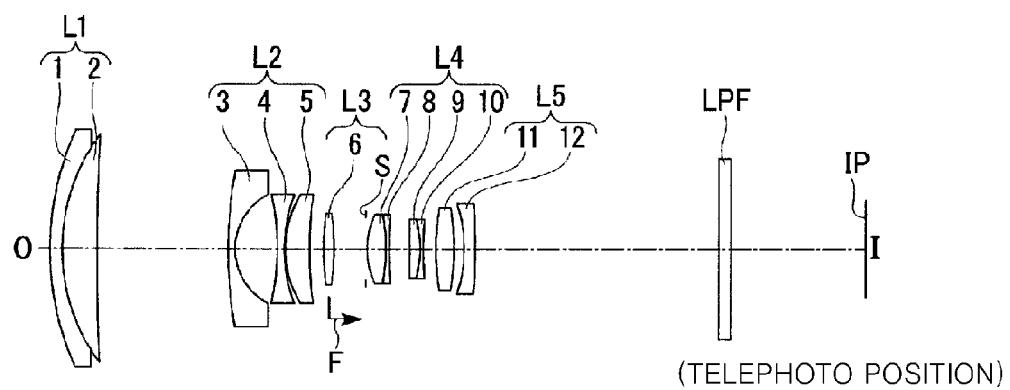
(TELEPHOTO POSITION)

FIG. 16
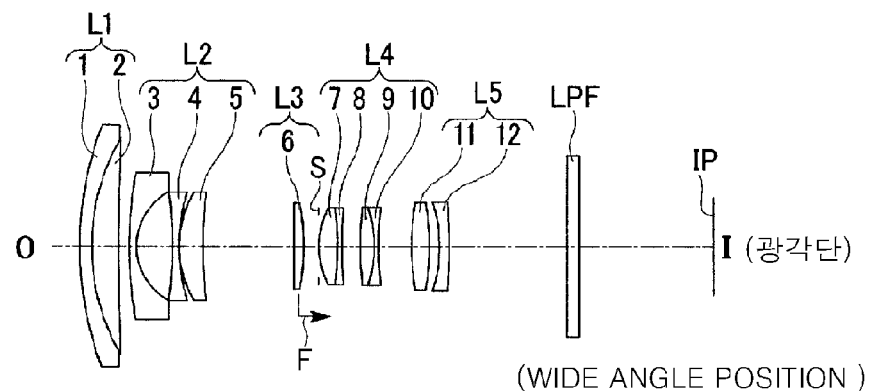
(WIDE ANGLE POSITION)
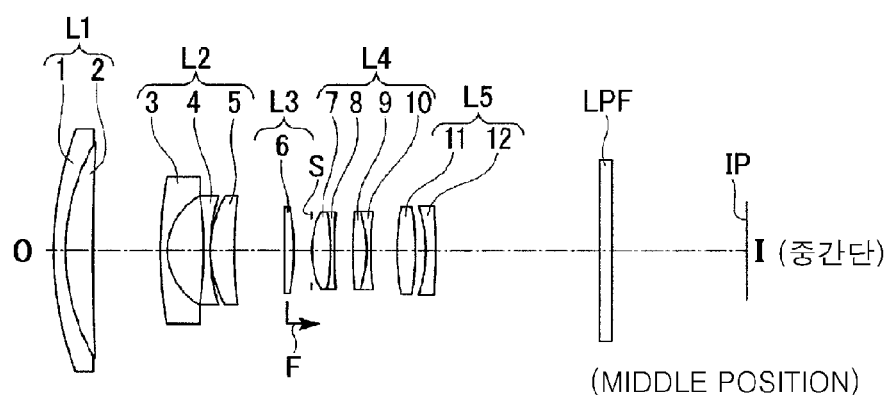
(MIDDLE POSITION)
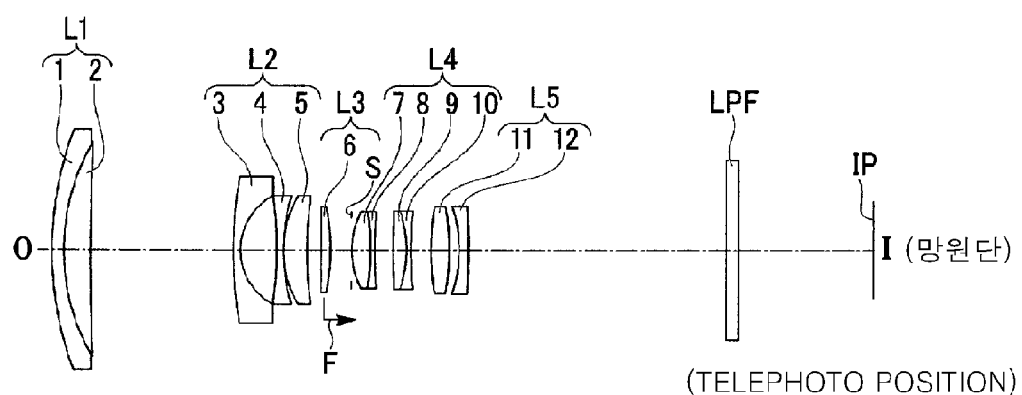
(TELEPHOTO POSITION)

FIG. 23
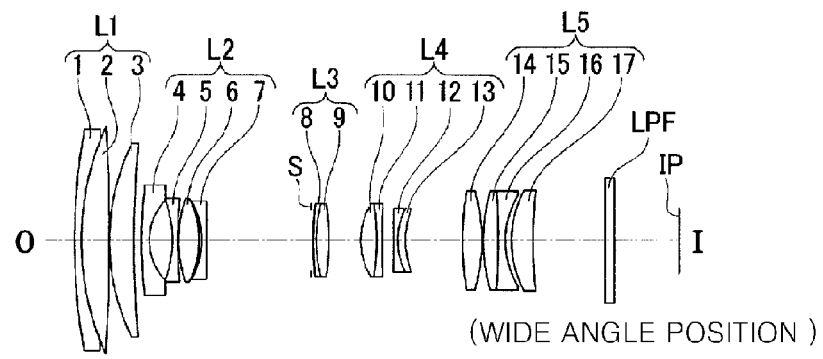
(WIDE ANGLE POSITION)
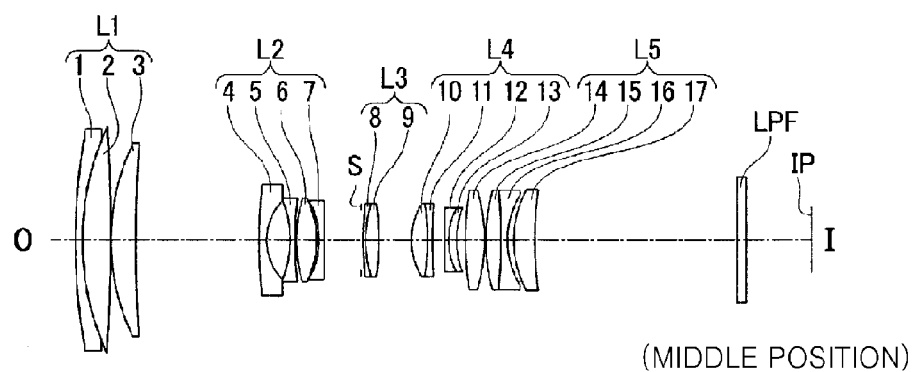
(MIDDLE POSITION)
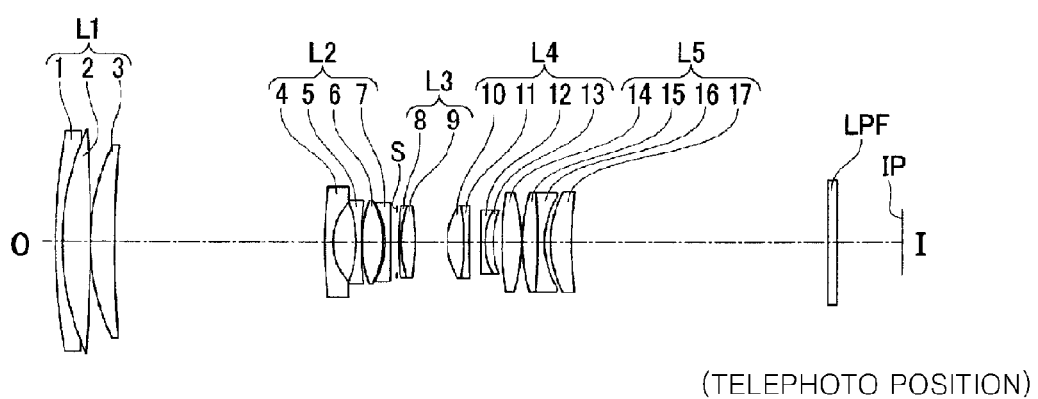
(TELEPHOTO POSITION)

ZOOM LENS AND PHOTOGRAPHING APPARATUS

CROSS-REFERENCE TO RELATED PATENT APPLICATION

This application is a continuation of U.S. patent application Ser. No. 12/972,304, filed on Dec. 17, 2010, which claims the benefit of Japanese Patent Application No. 2009-286705, filed on Dec. 17, 2009, in the Japanese Patent Office, and Korean Patent Application No. 10-2010-0119789, filed on Nov. 29, 2010, the disclosures of which are incorporated herein in their entirety by reference.

BACKGROUND

The invention relates to a zoom lens and a photographing apparatus.

Focusing mechanisms of zoom lenses at a minimum distance are classified into focusing by a first lens group that is closest to an object side and focusing by a lens group other than the first lens group.

A zoom lens focused by the first lens group can be easily designed due to its simple structure. In particular, in a zoom lens including a positive lens having a wide angle region which is disposed at the front of the first lens group, the diameter of the zoom lens may be increased. A zoom lens focused by a lens group other than the first lens group which overcomes drawbacks of the zoom lens focused by the first lens group is focused by a negative second lens group disposed at an image side of the first lens group and includes a positive lens disposed at the front of the second lens group, and thus is suitable for high zoom magnification.

However, in the zoom lens in which the focusing is performed by the negative second lens group and the positive lens is disposed at the front of the negative second lens group, the second lens group generally plays a critical role in zooming, and thus the number of lenses may increase and the weight of the zoom lens may also increase. Thus, such a zoom lens is not suitable for controlling a minute shift of the second lens group forward or backward, in particular, auto-focusing control by bokeh sensing of an imaging device.

It is also known that, a zoom lens including a positive first lens group, a negative second lens group, and a positive third lens group which are sequentially arranged from an object side may be focused by the third lens group.

However, since the number of lenses increases when the focusing is performed by the third lens group, a minute control of the third lens group, for example a minute shift of the third lens group forward or backward, is not easy.

SUMMARY

Embodiments of the invention provide a zoom lens having high zoom magnification, excellent optical performance from the wide angle position to the telephoto position, and excellent focusing performance at the minimum distance, and a photographing apparatus including the zoom lens.

According to an embodiment of the invention, there is provided a zoom lens including: a first lens group having a positive refractive power, a second lens group having a negative refractive power, and an additional lens grouping having a positive refractive power, which are sequentially arranged from an object side, wherein the additional lens grouping comprises a third lens group having a positive refractive power, wherein when an effective focal length of the third lens group refers to $f_3$[mm], and an effective focal length of the additional lens grouping at the telephoto position refers to $f_{rt}$[mm], and an effective focal length of the second lens group refers to $f_2$[mm], the zoom lens may satisfy the following formulae.

$$0.1 < f_3/f_{rt} < 2.0,$$

$$1.5 < |f_3/f_2| < 4.0 \qquad \text{Formulae}$$

A distance between the first lens group and the second lens group may increase and a distance between the second lens group and the third lens group may decrease during zooming from the wide angle position to the telephoto position.

The third lens group may be shifted towards an image side to perform a focusing at a minimum distance.

The third lens group may include one piece of positive lens.

When a transverse magnification of the third lens group when focused on an object at infinite distance at the telephoto position refers to $\beta_{3t}$, and a transverse magnification of a lens group that is disposed closer to the image side than the third lens group and focused on an object at infinite distance at the telephoto position refers to $\beta_{xt}$, the zoom lens may satisfy the following formula.

$$|(1-\beta_{3t}^2) \times \beta_{xt}^2| > 2.0 \qquad \text{Formula}$$

When a transverse magnification of the third lens group when focused on an object at infinite distance at the wide angle position refers to $\beta_{3w}$, and a transverse magnification of a lens group that is disposed closer to the image side than the third lens group and focused on an object at infinite distance at the telephoto position refers to $\beta_{xw}$, the zoom lens may satisfy the following formula.

$$\{(1-\beta_{3w}^2) \times \beta_{xw}^2\} / \{(1-\beta_{3t}^2) \times \beta_{xt}^2\} > 0 \qquad \text{Formula}$$

An effective focal length of the first lens group refers to $f_1$[mm], an effective focal length of the second lens group refers to $f_2$[mm], a total focal length of the zoom lens at the wide angle position refers to $f_w$[mm], and a total focal length of the zoom lens at the telephoto position refers to $f_t$[mm], the zoom lens may satisfy the following formulae.

$$1.0 < |f_1/(f_w \times f_t)^{1/2}| < 5.0,$$

$$0.1 < |f_2/(f_w \times f_t)^{1/2}| < 1.0,$$

$$0.5 < |f_{rt}/(f_w \times f_t)^{1/2}| < 3.0 \qquad \text{Formulae}$$

The additional lens grouping may further include a fourth lens group and a fifth lens group which are sequentially disposed between the third lens group and the image side, wherein the distance between the fourth lens group and the fifth lens group may vary during zooming.

BRIEF DESCRIPTION OF THE DRAWINGS

The above and other features and advantages of the invention will become more apparent by describing in detail exemplary embodiments thereof with reference to the attached drawings in which:

FIG. 1 shows a zoom lens according to an embodiment of the invention;

FIG. 2 shows a zoom lens according to Embodiment 1;

FIG. 9 shows a zoom lens according to Embodiment 2;

FIG. 16 shows a zoom lens according to Embodiment 3;

FIG. 23 shows a zoom lens according to Embodiment 4;

DETAILED DESCRIPTION

Figure 3:
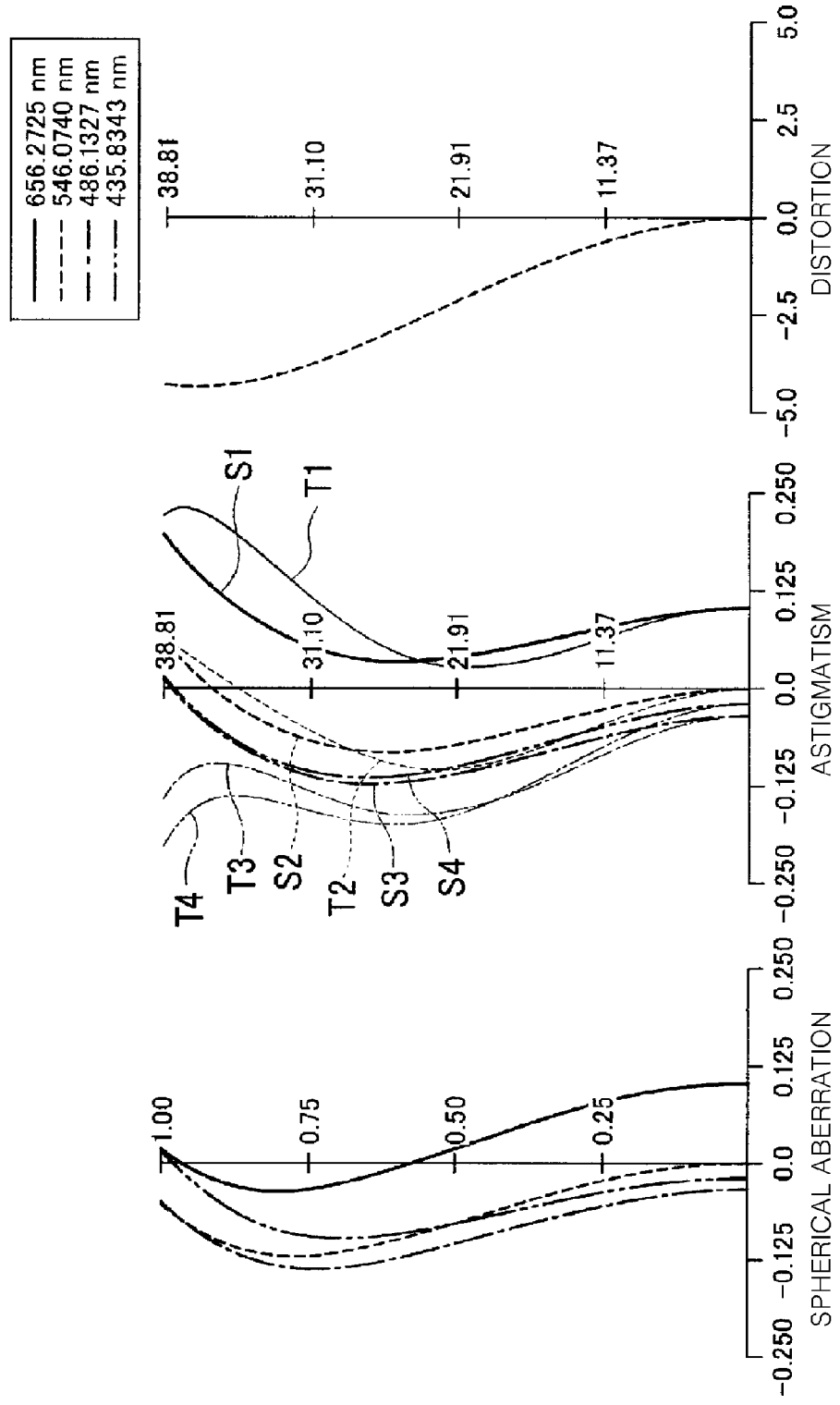
FIG. 3 shows an aberration diagram of the zoom lens according to Embodiment 1 when focused on an object at infinite distance at the wide angle position.

Hereinafter, a zoom lens and a photographing apparatus according to the invention will now be described more fully with reference to the accompanying drawings, in which exemplary embodiments of the invention is shown.

Lens data, etc., which will be described hereinafter are exemplary data, are not limited thereto and may be modified in various ways not to change the scope of the invention.

A zoom lens according to an embodiment of the invention may be used as a photographing optical system of a photographing apparatus such as a watching camera, a digital video camera, and a digital still camera. Referring to FIG. 1, for example, the zoom lens may include a first lens group L1 having a positive refractive power, a second lens group L2 having a negative refractive power, and the additional lens grouping Lr having a positive refractive power, which are sequentially arranged from an object side O. The additional lens grouping Lr may include a third lens group L3 having a positive refractive power, a fourth lens group L4 having a negative refractive power, and a fifth lens group L5 having a positive refractive power. FIG. 1 shows arrangements of lenses at the wide angle position, the middle position, and the telephoto position of the zoom lens.

The first lens group L1 may include a negative meniscus lens 1 with a convex surface towards the object side O and a positive lens 2. The meniscus lens 1 and the positive lens 2 may form a doublet lens. The second lens group L2 may include a negative meniscus lens 3 with a convex surface towards the object side O, a biconcave lens 4, and a positive lens 5 with a convex surface towards the object side O. The third lens group L3 may include a biconvex lens 6. The fourth lens group L4 may include a doublet lens having a positive lens 7 and a negative lens 8 and a doublet lens having a positive lens 9 and a negative lens 10. The fifth lens group L5 may include a positive lens 11 and a negative lens 12. In addition, a stop S is disposed between the third lens group L3 and the fourth lens group L4, and an optical filter such as a low pass filter (LPF) is disposed between the fifth lens group L5 and an image plane IP.

In the zoom lens, each of the first to fifth lens groups L1 to L5 may move towards the object side O during zooming from the wide angle position to the telephoto position such that an axial distance between the first lens group L1 and the second lens group L2 increases and an axial distance between the second lens group L2 and the third lens group L3 decreases, as shown in FIG. 1. In addition, the stop S may be integrally shifted with the fourth lens group L4 during zooming. In addition, as shown with an arrow F of FIG. 1, the third lens group L3 is shifted towards the image plane side I to perform a focusing at the minimum distance. The doublet lens including the positive lens 9 and the negative lens 10 of the fourth lens group L4 is shifted in a direction perpendicular to the optical axis to correct image shake caused by hand shaking.

In a photographing apparatus, light incident from the object side O of the zoom lens is formed on an image plane IP. For example, an image is formed on an image surface of an imaging device (photoelectric conversion device such as a charge coupled device (CCD) or a complementary metal-oxide semiconductor device (CMOS) sensor. The photographing apparatus photoelectrically converts the light received by the imaging device into an electrical signal and outputs the electrical signal, and then forms a digital image corresponding to an image of a subject and records the digital image in a recording medium such as a hard disk drive (HDD), a memory card, an optical disk, and a magnetic tape. If the photographing apparatus is a film camera, the image plane IP is a film surface.

When an effective focal length of the third lens group L3 refers to $f_3$[mm], and an effective focal length of the additional lens grouping Lr (third to fifth lens groups L3 to L5) at the telephoto position refers to $f_{rt}$[mm], and an effective focal length of the second lens group L2 refers to $f_2$[mm], the zoom lens according to the current embodiment may satisfy Formulae 1 and 2 below.

$$0.1 < f_3/f_{rt} < 2.0 \quad \text{Formula 1}$$

$$1.5 < |f_3/f_2| < 4.0 \quad \text{Formula 2}$$

In order to obtain excellent optical performance from the wide angle position to the telephoto position, the arrangement of the refractive power of the third lens group L3 (focus lens group) needs to be optimized. Formulae 1 and 2 limit the arrangement of the refractive power of the third lens group. If the $f_3/f_{rt}$ is less than the lower limit of Formula 1, a spherical aberration occurring at the third lens group L3 increases so that variation of the spherical aberration caused by focusing cannot be reduced. If the $f_3/f_{rt}$ is greater than the upper limit of Formula 1, a moving distance for focusing cannot be controlled at the telephoto position, and thus the size and the weight of the zoom lens may increase. In addition, in order to correct the spherical aberration of the third lens group L3 when the $f_3/f_{rt}$ is less than the lower limit of Formula 1, the number of lens of the third lens group L3 increases to increase the weight of the third lens group L3.

If the $|f_3/f_2|$ is less than the lower limit of Formula 2, a high magnification may not be obtained. If the $|f_3/f_2|$ is greater than the upper limit of Formula 2, the refractive power of the second lens group L2 increases so that a Petzval sum cannot be reduced, and a field curvature or astigmatism may increase.

The zoom lens according to the current embodiment may satisfy Formulae 3 and 4 below.

$$0.2 < f_3/f_{rt} < 1.5 \quad \text{Formula 3}$$

$$2.0 < |f_3/f_2| < 3.2 \quad \text{Formula 4}$$

The zoom lens according to the current embodiment may satisfy Formula 5 below.

$$0.4 < f_3/f_{rt} < 1.5 \quad \text{Formula 5}$$

In the zoom lens according to the current embodiment, the third lens group L3 may include one piece of positive lens in order to reduce the weight of the third lens group L3. Accordingly, the third lens group L3 may be easily shifted forward and backward, and the zoom lens may be suitable for, so called, mountain climbing auto-focusing control by bokeh sensing of a solid imaging device.

If a transverse magnification of the third lens group L3 when focused on an object at infinite distance at the telephoto position refers to $\beta_{3t}$, and a transverse magnification of the fourth and fifth lens groups L4 and L5 which are disposed closer to the image side I than the third lens group L3 and focused on an object at infinite distance at the telephoto position refers to $\beta_{xt}$, the zoom lens according to the current embodiment may satisfy Formula 6 below.

$$|(1-\beta_{3t}^2) \times \beta_{xt}^2| > 2.0 \quad \text{Formula 6}$$

When the zoom lens satisfies Formula 6, a moving distance for focusing at the telephoto position may be reduced.

The zoom lens may satisfy Formula 7 below.

$$|(1-\beta_{3t}^2) \times \beta_{xt}^2| > 3.0 \quad \text{Formula 7}$$

The zoom lens may satisfy Formula 8 below.

$$5.0 > |(1-\beta_{3t}^2) \times \beta_{xt}^2| \quad \text{Formula 8}$$

When the zoom lens satisfies Formula 8, focusing at the telephoto position may not be too sensitive, and thus stop precision of the third lens group L3 may be optimized to simplify a focusing device.

If a transverse magnification of the third lens group L3 when focused on an object at infinite distance at the wide angle position refers to $\beta_{3w}$, and a transverse magnification of the fourth and fifth lens groups L4 and L5 which are disposed closer to the image side I than the third lens group L3 and focused on an object at infinite distance at the telephoto position refers to $\beta_{xw}$, the zoom lens according to the current embodiment may satisfy Formula 9 below.

$$\{(1-\beta_{3w}^2) \times \beta_{xw}^2\}/\{(1-\beta_{3t}^2) \times \beta_{xt}^2\} > 0 \quad \text{Formula 9}$$

When the zoom lens satisfies Formula 9, the third lens group L3 is shifted in the same direction at the wide angle position and the telephoto position when focused from the infinite distance to the minimum distance at the telephoto position, and thus the shift of the third lens group L3 may be easily controlled.

The zoom lens may satisfy Formula 10 below.

$$\{(1-\beta_{3w}^2) \times \beta_{xw}^2\}/\{(1-\beta_{3t}^2) \times \beta_{3t}^2\} > 2 \quad \text{Formula 10}$$

When an effective focal length of the first lens group L1 refers to $f_1$[mm], an effective focal length of the second lens group L2 refers to $f_2$[mm], an effective focal length of the zoom lens at the wide angle position refers to $f_w$[mm], and an effective focal length of the zoom lens at the telephoto position refers to $f_t$[mm], the zoom lens according to the current embodiment may satisfy Formulae 11, 12, and 13 below $$1.0 < |f_1/(f_w \times f_t)^{1/2}| < 5.0 \quad \text{Formula 11}$$

$$0.1 < |f_2/(f_w \times f_t)^{1/2}| < 1.0 \quad \text{Formula 12}$$

$$0.5 < |f_{rt}/(f_w \times f_t)^{1/2}| < 3.0 \quad \text{Formula 13}$$

When the zoom lens satisfies Formula 11, the spherical aberration may be easily corrected. When the zoom lens satisfies Formula 12, a desired zoom magnification may be easily obtained. In addition, when the zoom lens satisfies Formula 13, a desired back focal length may be easily obtained.

The zoom lens according to the current embodiment may satisfy Formulae 14, 15 and 16 below.

$$1.3 < |f_1/(f_w \times f_t)^{1/2}| < 4.0 \quad \text{Formula 14}$$

$$0.18 < |f_2/(f_w \times f_t)^{1/2}| < 0.7 \quad \text{Formula 15}$$

$$1.0 < |f_{rt}/(f_w \times f_t)^{1/2}| < 2.5 \quad \text{Formula 16}$$

The zoom lens according to the current embodiment may satisfy Formulae 17, 18 and 19 below.

$$2.5 < |f_1/(f_w \times f_t)^{1/2}| < 4.0 \quad \text{Formula 17}$$

$$0.35 < |f_2/(f_w \times f_t)^{1/2}| < 0.7 \quad \text{Formula 18}$$

$$1.1 < |f_{rt}/(f_w \times f_t)^{1/2}| < 1.8 \quad \text{Formula 19}$$

In the zoom lens according to the current embodiment, the fourth lens group L4 and the fifth lens group L5 are sequentially disposed between the third lens group L3 and the image side. During zooming, the distance between the fourth lens group L4 and the fifth lens group L5 may vary. Accordingly, in the additional lens grouping L3 having the positive refractive power, variation of the image plane according to the zooming may be easily corrected.

In addition, when the third lens group L3 includes an aspheric surface having a positive refractive power that decreases as farther from the optical axis, variation of the spherical aberration according to focusing may be reduced.

The zoom lens according to the current embodiment may have high zoom magnification, excellent optical performance from the wide angle position to the telephoto position, and excellent focusing performance at the minimum distance. In addition, since the third lens group L3 may be simplified and the weight thereof may be reduced, a minute shift of the third lens group L3 forward and backward may be easily performed. Accordingly, the zoom lens according to the current embodiment may be suitably used for the mountain climbing auto-focusing control by bokeh sensing of the solid imaging device. For example, a small photographing apparatus that is suitable for a lens exchangeable lens digital still camera, or the like, and has high optical performance may be provided.

However, the invention is not limited thereto and may be modified in various ways not to change the scope of the invention.

The additional lens grouping Lr is not limited to those illustrated in FIG. 1, and the number of the lens group and the constitution and arrangement of lenses may vary. The design of the zoom lens may vary. For example, the distance between two doublet lenses of the fourth lens L4 may be increased so that the zoom lens has 6 lens groups during zooming from the wide angle position the telephoto position.

Hereinafter, the design data of the zoom lens according to an embodiment will be described. However, the invention is not limited to the following embodiments and may be modified in various ways not to change the scope of the invention.

Hereinafter, a surface number Si, where i is a natural number, is the number of lens surface that is sequentially increased from a first lens surface of a lens that is closest to the object side O towards the image side. R is a curvature radius [mm] of the lens surface corresponding to each surface number Si. D is an axial distance [mm] between the $i^{th}$ lens surface and $(i+1)^{th}$ lens surface from the object side O and D1 to D5 (when varied) are axial distances [mm] therebetween at the wide angle position (f=18.55), at the middle position (f=28.0), and at the telephoto position (f=53.4). In addition, Nd is a refractive index of each lens, and Vd is an Abbe's number of each lens. In addition, moving distances of the third lens group L3 for focusing at the minimum distance (0.45 m) at the wide angle position (f=18.55), at the middle position (f=28.0), and at the telephoto position (f=53.4) are shown. Also, the unit of a focal length is mm.

Meanwhile, the aspheric surface used in the zoom lens may be obtained by the Formula 20 below.

$$Z = \frac{Ch^2}{1+\sqrt{1-(1+K)C^2h^2}} + \sum_{i=2}^{5} A_{2i}h^{2i}$$ Formula 20

Here, an optical axis is referred to as an x-axis. x indicates distance from the vertex of a lens along the optical axis, h indicates the distance in the direction perpendicular to the optical axis direction, K indicates a conic constant, $A_{2i}$ indicates aspheric coefficients, and C indicates the inverse of radius of curvature (R) at the vertex of the lens.

Embodiment 1

FIG. 2 shows a zoom lens designed based on data of Embodiment 1. The zoom lens shown in FIG. 2 has the same constitution as the zoom lens shown in FIG. 1, and lens data of the zoom lens is listed in Table 1 below.

TABLE 1

| Lens surface | R | D | nd | vd |
|---|---|---|---|---|
| S1 | 52.409 | 2.00 | 1.84666 | 23.78 |
| S2 | 35.337 | 6.50 | 1.69680 | 55.46 |
| S3 | 312.400 | D1 | | |
| S4 | 79.275 | 1.25 | 1.71300 | 53.94 |
| S5 | 10.946 | 7.10 | | |
| S6 | −61.407 | 2.10 | 1.69680 | 55.46 |
| S7 | 23.884 | 0.27 | | |
| S8 | 18.000 | 3.80 | 1.80518 | 25.46 |
| S9 | 63.286 | D2 | | |
| S10 | 37.784 | 2.00 | 1.60311 | 60.69 |
| S11 | −45.794 | D3 | | |
| S12 | stop | 0.10 | | |
| S13 | 13.511 | 3.35 | 1.48749 | 70.44 |
| S14 | −37.908 | 0.70 | 1.84666 | 23.78 |
| S15 | 95.533 | 3.84 | | |
| S16 | −306.745 | 1.75 | 1.70154 | 41.15 |
| S17 | −18.178 | 0.55 | 1.63854 | 55.45 |
| S18 | 38.555 | D4 | | |
| S19 | 30.717 | 3.25 | 1.58313 | 59.46 |
| S20 | −27.831 | 1.51 | | |
| S21 | −23.230 | 1.80 | 1.80611 | 40.73 |
| S22 | −84.987 | D5 | | |
| S23 | plane | 2.24 | 1.51633 | 64.14 |
| S24 | plane | 0.10 | | |

Variable distances during zooming from the wide angle position to the telephoto position are shown in Table 2 below.

TABLE 2

| Variable distance | Wide angle position (f = 18.55) | Middle position (f = 28.0) | Telephoto position (f = 53.4) |
|---|---|---|---|
| D1 | 0.861 | 9.606 | 23.813 |
| D2 | 15.335 | 9.047 | 2.380 |
| D3 | 4.196 | 4.585 | 5.838 |
| D4 | 4.530 | 3.323 | 1.930 |
| D5 | 20.963 | 28.475 | 43.026 |

Moving distance of the third lens group L3 for focusing when the object distance is 0.45 m are shown in Table 3 below.

TABLE 3

| Wide angle position | Middle position | Telephoto position |
|---|---|---|
| 1.810 | 2.109 | 3.149 |

Aspheric coefficients are shown in Table 4 below.

TABLE 4

| Lens surface | R | K | A4 | A6 | A8 | A10 |
|---|---|---|---|---|---|---|
| S20 | −27.831 | 0.00000 | 7.44814E−05 | 4.32792E−07 | 0.00000 | 0.00000 |

Figure 4:
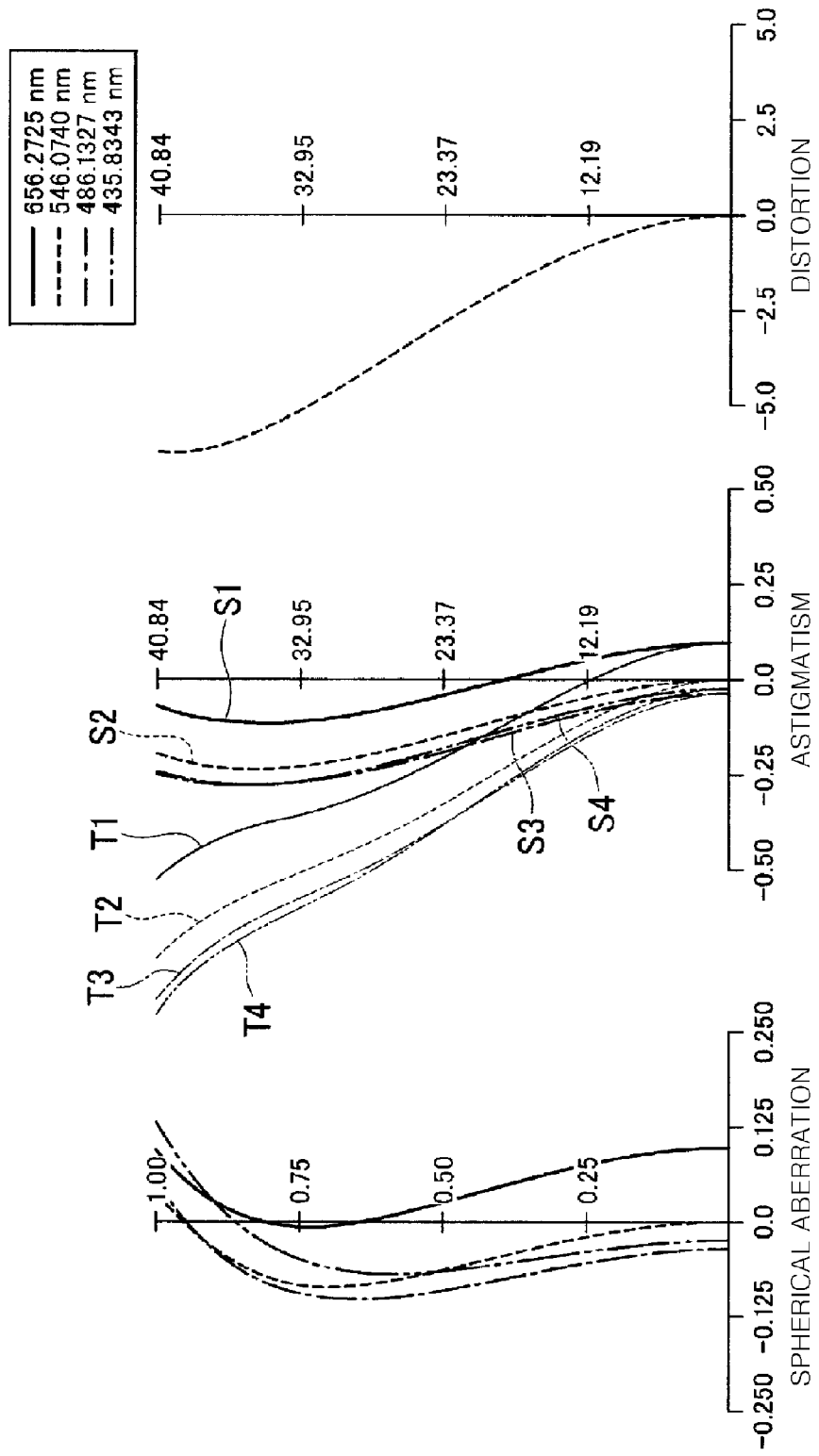
FIG. 4 shows an aberration diagram of the zoom lens according to Embodiment 1 when focused on an object at a minimum distance (0.45 m) at the wide angle position.
Figure 5:
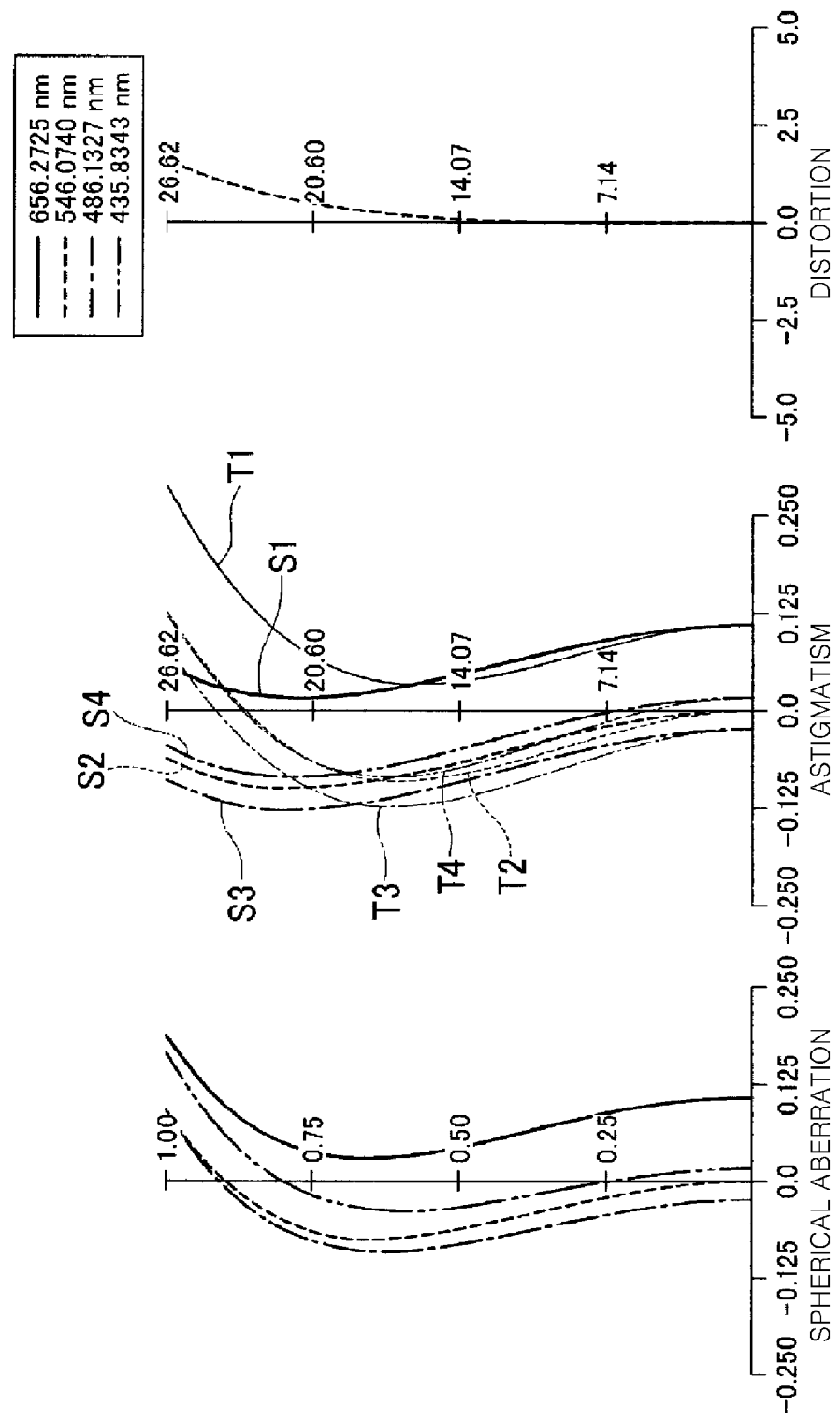
FIG. 5 shows an aberration diagram of the zoom lens according to Embodiment 1 when focused on an object at infinite distance at the middle position.
Figure 6:
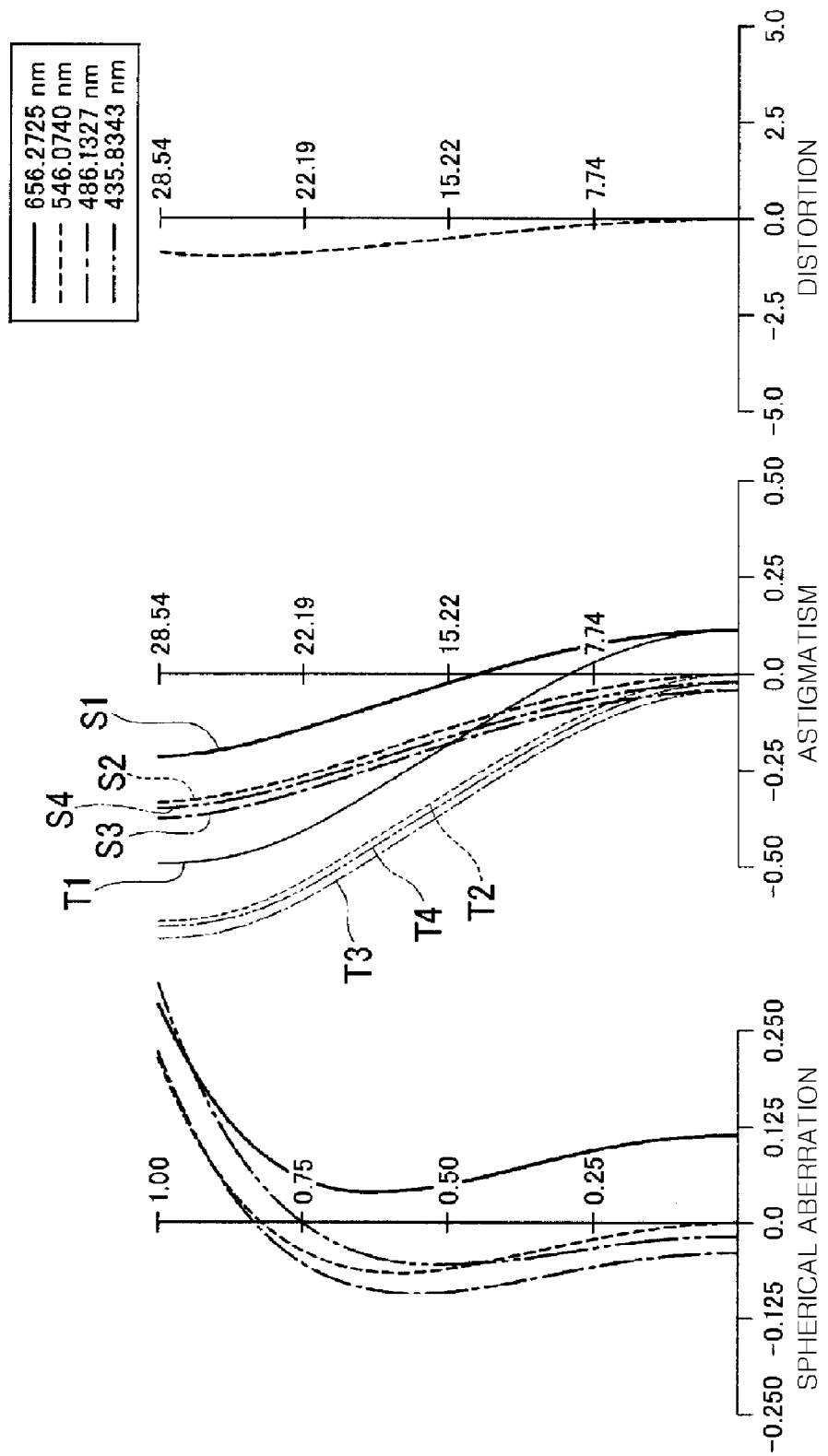
FIG. 6 shows an aberration diagram of the zoom lens according to Embodiment 1 when focused on an object at a minimum distance (0.45 m) at the middle position.
Figure 7:
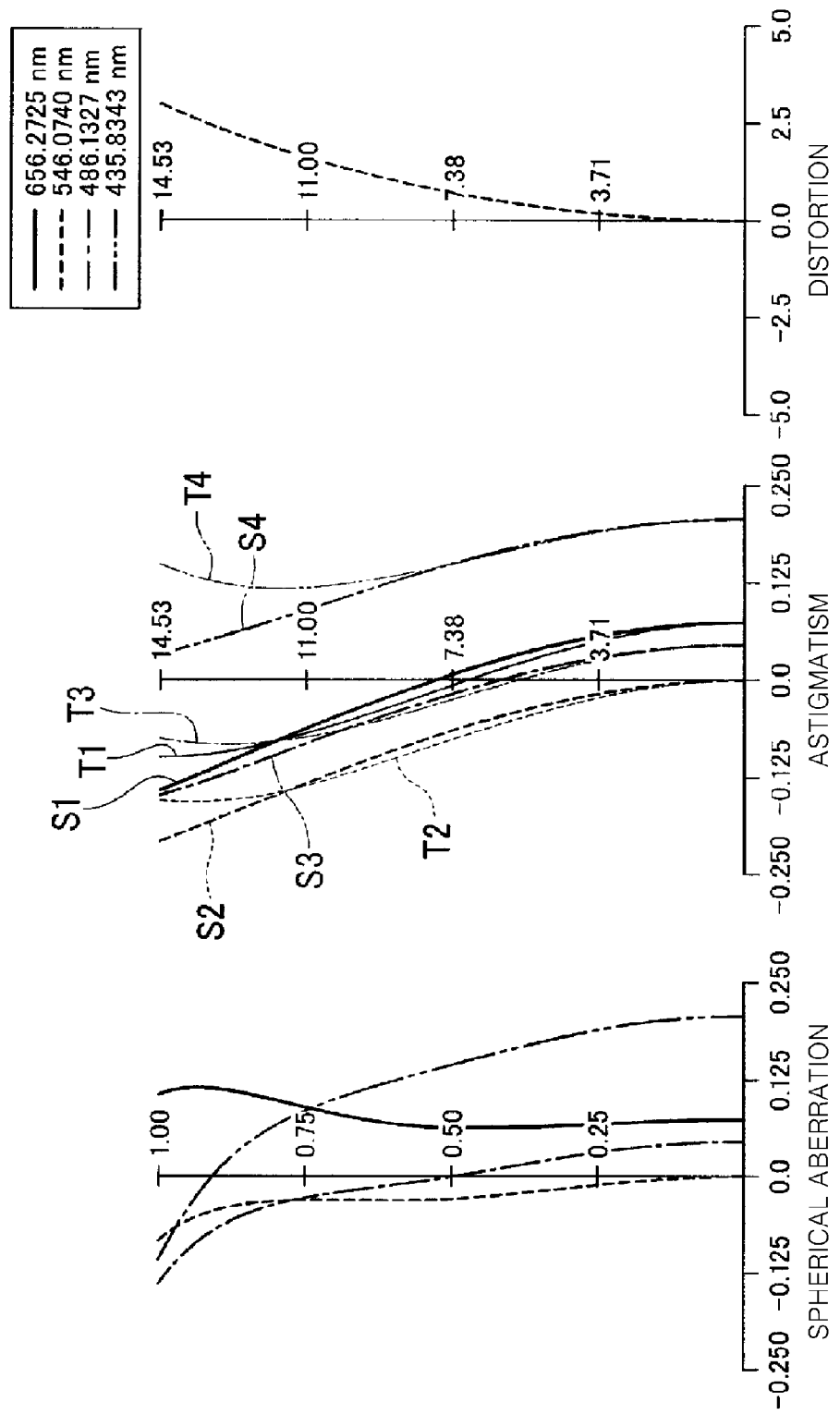
FIG. 7 shows an aberration diagram of the zoom lens according to Embodiment 1 when focused on an object at infinite distance at the telephoto position.
Figure 8:
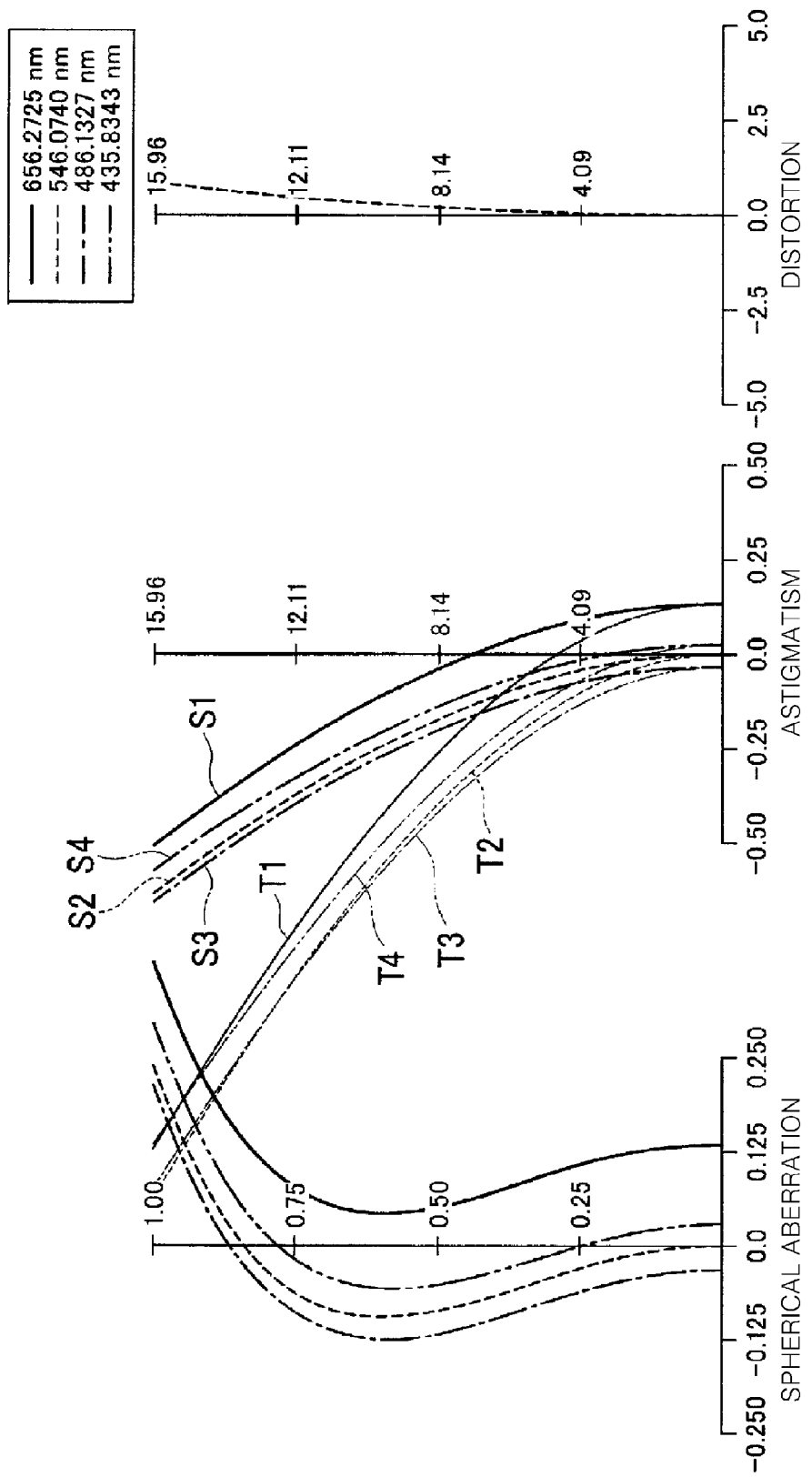
FIG. 8 shows an aberration diagram of the zoom lens according to Embodiment 1 when focused on an object at a minimum distance (0.45 m) at the telephoto position.

With respect to the zoom lens according to Embodiment 1, FIG. 3 shows an aberration diagram when focused on an object at infinite distance at the wide angle position, FIG. 4 shows an aberration diagram when focused on an object at a minimum distance (0.45 m) at the wide angle position, FIG. 5 shows an aberration diagram when focused on an object at infinite distance at the middle position, FIG. 6 shows an aberration diagram when focused on an object at a minimum distance (0.45 m) at the middle position, FIG. 7 shows an aberration diagram when focused on an object at infinite distance at the telephoto position, and FIG. 8 shows an aberration diagram when focused on an object at a minimum distance (0.45 m) at the telephoto position.

FIGS. 3 to 8 show spherical aberration at a wavelength of about 656 nm (solid line), at a wavelength of about 588 nm (dashed line), at a wavelength of about 486 nm (chain line), and at a wavelength of about 436 nm (chain double-dashed line).

FIGS. 3 to 8 show astigmatism of sagittal rays (S1 to S4) and tangential rays (T1 to T4) at each wavelength.

FIGS. 3 to 8 show distortion at a wavelength of about 588 nm (dashed line). In the zoom lens according to Embodiment 1, the aberrations are corrected as shown in FIGS. 3 to 8.

Embodiment 2

FIG. 9 shows a zoom lens designed based on data according to Embodiment 2. The zoom lens shown in FIG. 9 has the same constitution as the zoom lens shown in FIG. 1, and lens data of the zoom lens is listed in Table 5 below. Table 5 is listed in the same manner as in Table 1.

TABLE 5

| Lens surface | R | D | nd | vd |
|---|---|---|---|---|
| S1 | 53.724 | 2.00 | 1.80518 | 25.46 |
| S2 | 34.435 | 6.30 | 1.69680 | 55.46 |
| S3 | 328.432 | D1 | | |
| S4 | 78.396 | 1.20 | 1.71300 | 53.94 |
| S5 | 10.961 | 7.59 | | |
| S6 | −46.070 | 1.34 | 1.69680 | 55.46 |
| S7 | 29.175 | 0.12 | | |
| S8 | 19.296 | 4.15 | 1.80518 | 25.46 |
| S9 | 75.176 | D2 | | |
| S10 | 50.691 | 1.86 | 1.65160 | 58.40 |
| S11 | −41.933 | D3 | | |
| S12 | stop | 0.10 | | |
| S13 | 12.516 | 3.39 | 1.48749 | 70.44 |
| S14 | −43.926 | 0.60 | 1.84666 | 23.78 |
| S15 | 61.068 | 3.76 | | |
| S16 | −196.434 | 1.80 | 1.70154 | 41.15 |
| S17 | −18.007 | 0.55 | 1.65160 | 58.40 |
| S18 | 45.182 | D4 | | |
| S19 | 28.582 | 3.30 | 1.58313 | 59.46 |
| S20 | −28.733 | 1.73 | | |
| S21 | −25.040 | 2.07 | 1.80611 | 40.73 |
| S22 | −119.822 | D5 | | |
| S23 | plane | 2.24 | 1.51633 | 64.14 |
| S24 | plane | 0.10 | | |

Variable distances during zooming from the wide angle position to the telephoto position are shown in Table 6 below.

TABLE 6

| Variable distance | Wide angle position (f = 18.55) | Middle position (f = 28.0) | Telephoto position (f = 53.4) |
|---|---|---|---|
| D1 | 0.850 | 9.422 | 23.523 |
| D2 | 15.365 | 9.027 | 2.340 |
| D3 | 4.147 | 4.555 | 5.816 |
| D4 | 4.519 | 3.284 | 1.894 |
| D5 | 20.764 | 28.285 | 42.896 |

Moving distance of the third lens group L3 for focusing when the object distance is 0.45 m are shown in Table 7 below.

TABLE 7

| Wide angle position | Middle position | Telephoto position |
|---|---|---|
| 1.795 | 2.107 | 3.160 |

Aspheric coefficients are shown in Table 8 below.

TABLE 8

| Lens surface | R | K | A4 | A6 | A8 | A10 |
|---|---|---|---|---|---|---|
| S20 | −28.733 | 0.00000 | 8.59850E−05 | 3.95336E−07 | 0.00000 | 0.00000 |

Figure 10:
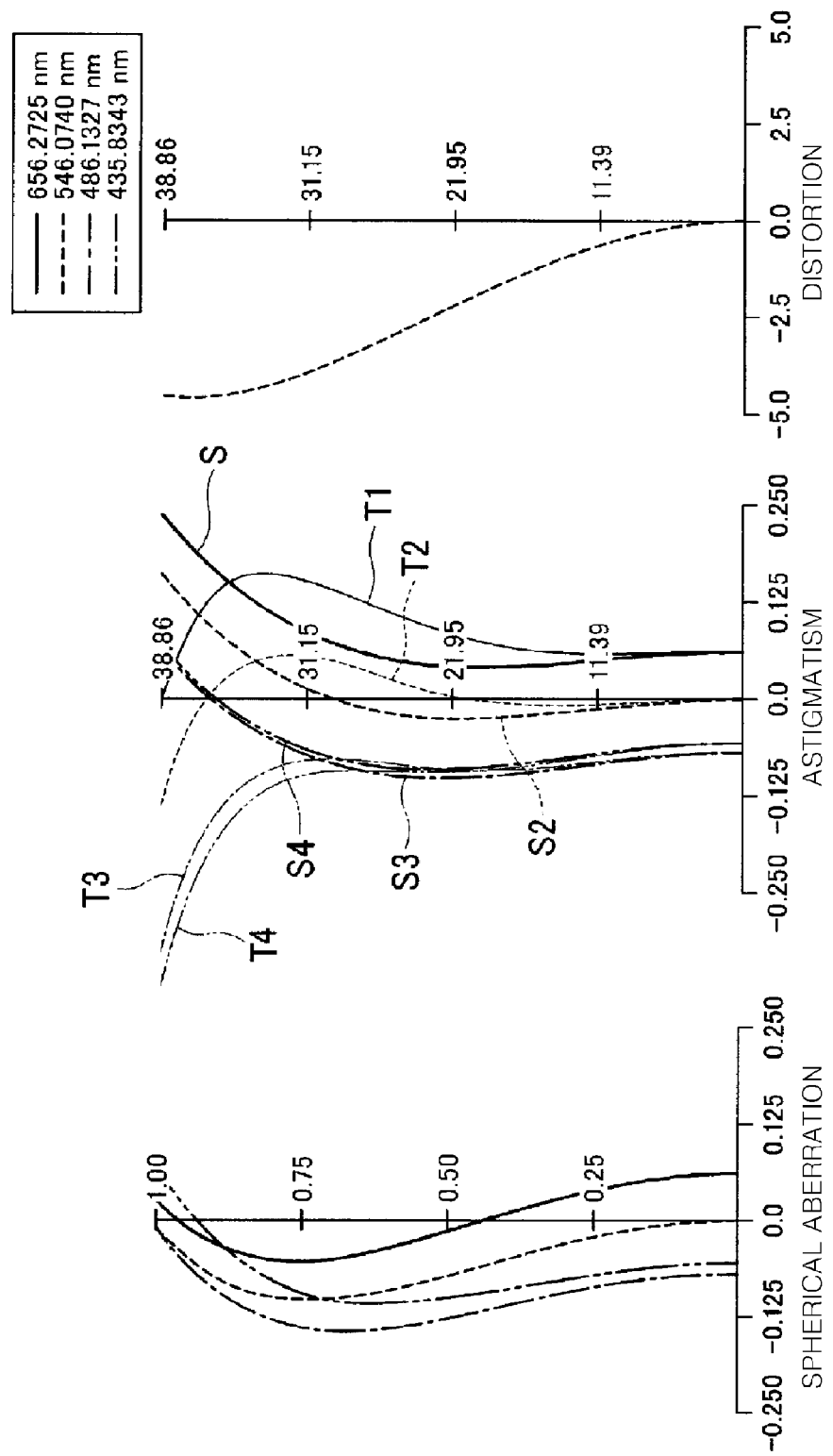
FIG. 10 shows an aberration diagram of the zoom lens according to Embodiment 2 when focused on an object at infinite distance at the wide angle position.
Figure 11:
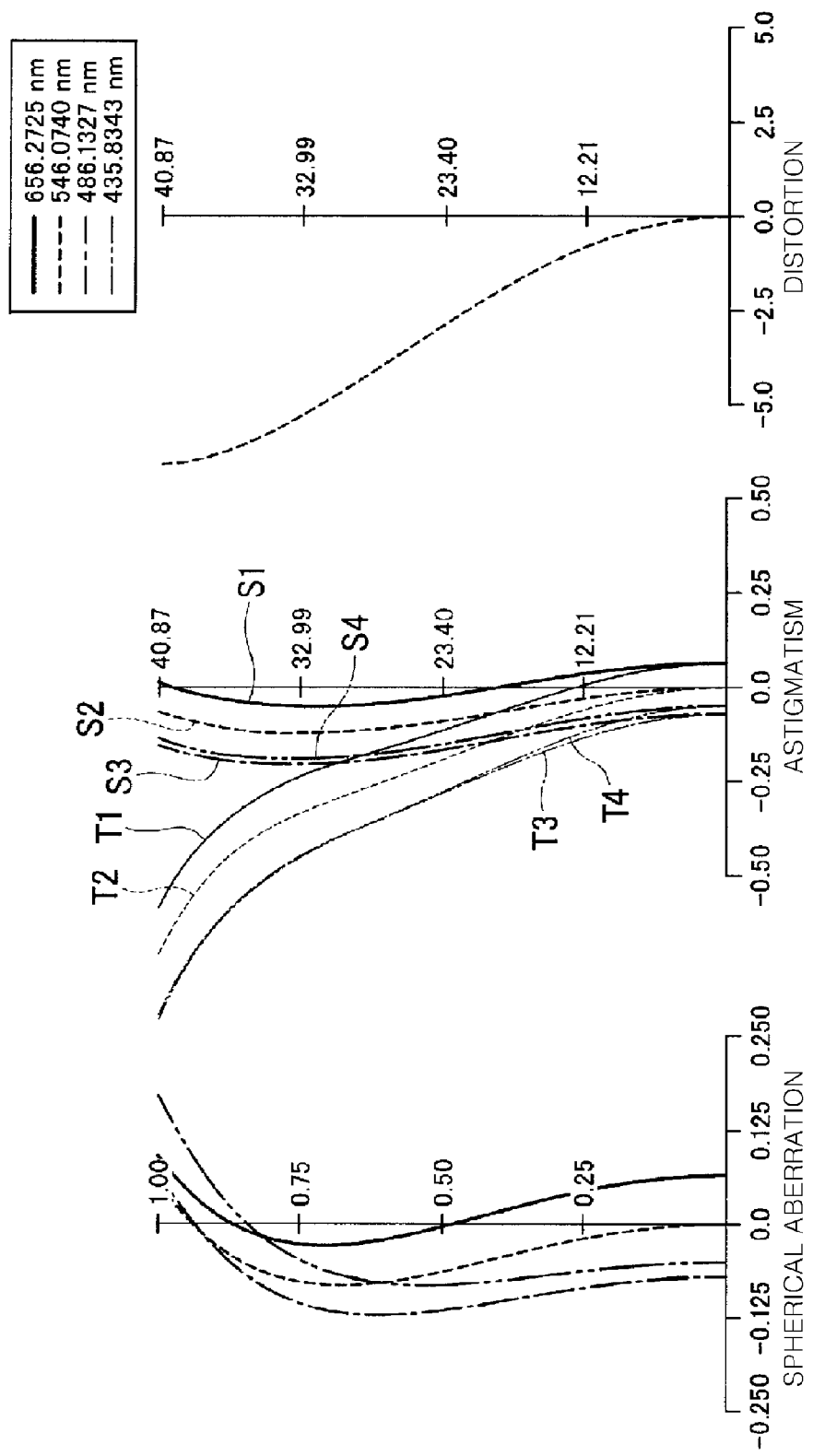
FIG. 11 shows an aberration diagram of the zoom lens according to Embodiment 2 when focused on an object at a minimum distance (0.45 m) at the wide angle position.
Figure 12:
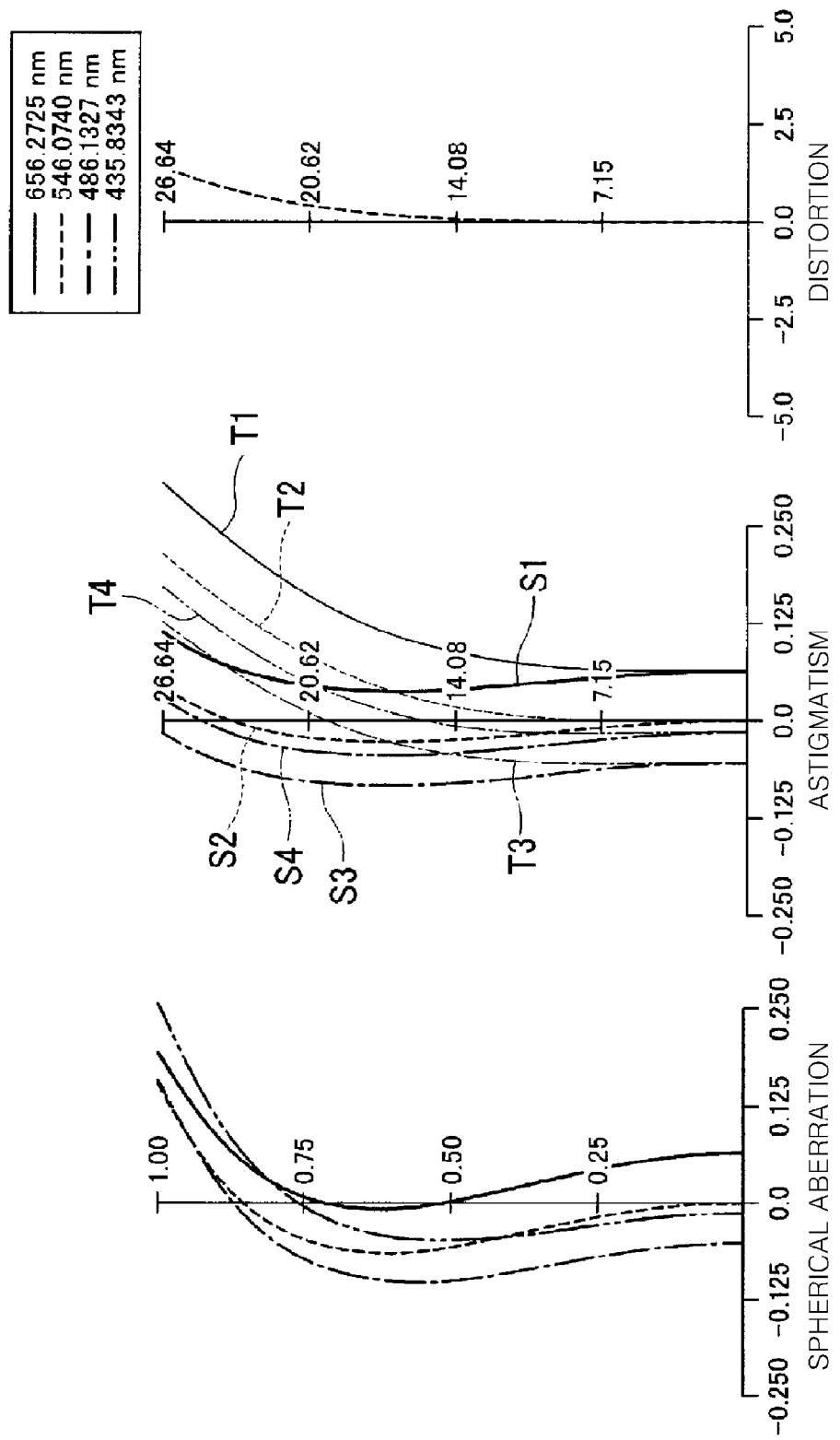
FIG. 12 shows an aberration diagram of the zoom lens according to Embodiment 2 when focused on an object at infinite distance at the middle position.
Figure 13:
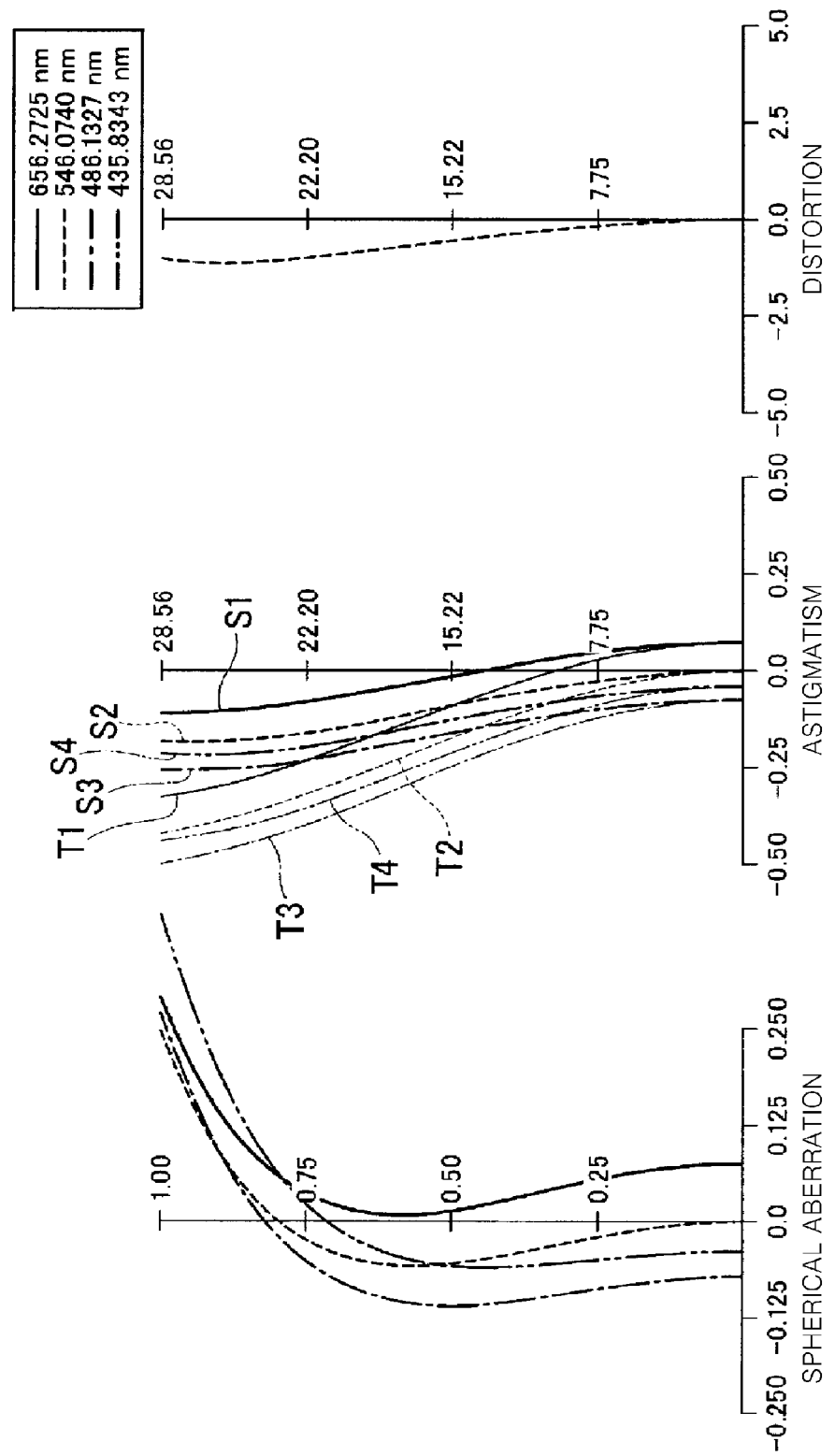
FIG. 13 shows an aberration diagram of the zoom lens according to Embodiment 2 when focused on an object at a minimum distance (0.45 m) at the middle position.
Figure 14:
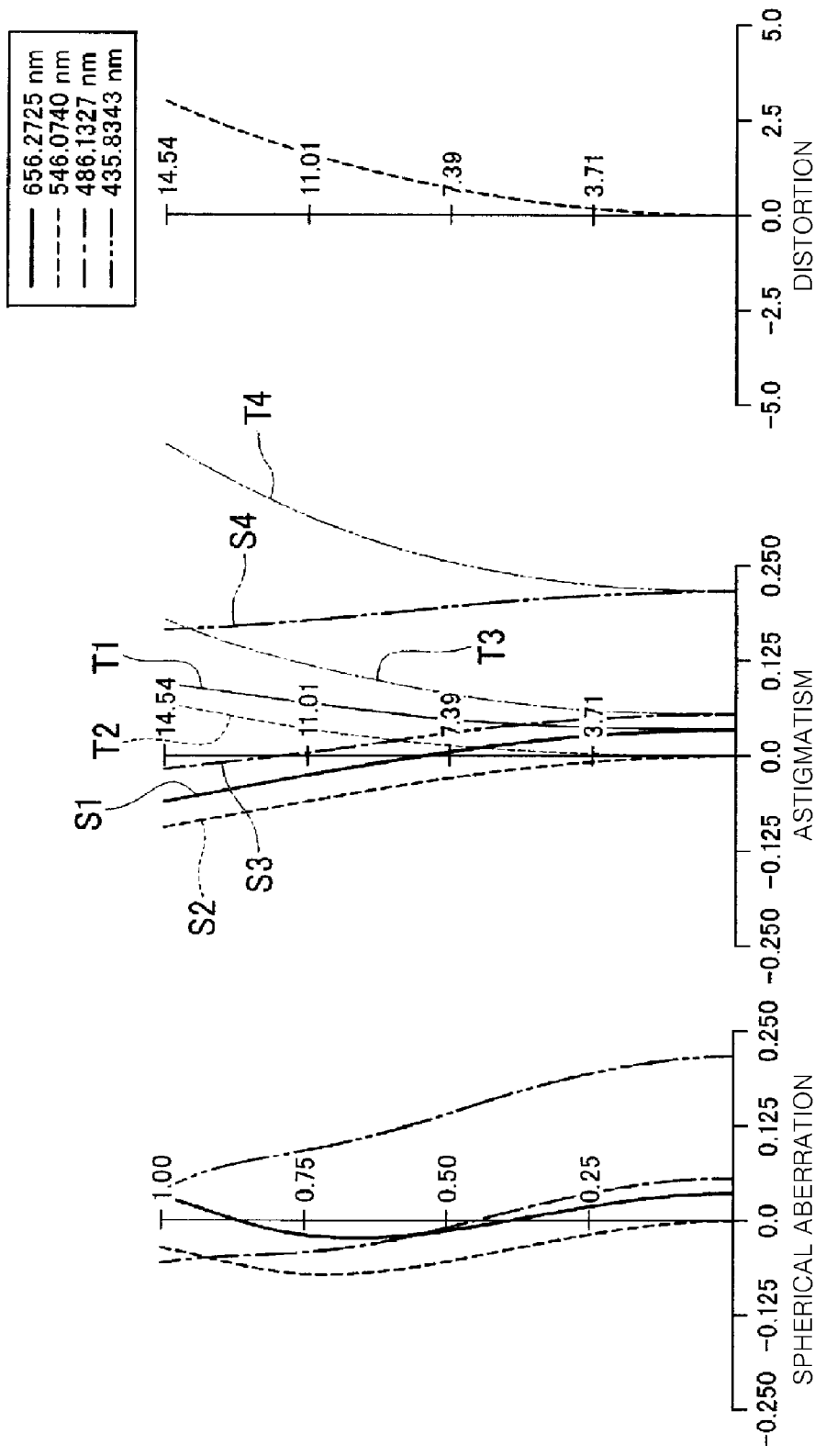
FIG. 14 shows an aberration diagram of the zoom lens according to Embodiment 2 when focused on an object at infinite distance at the telephoto position.
Figure 15:
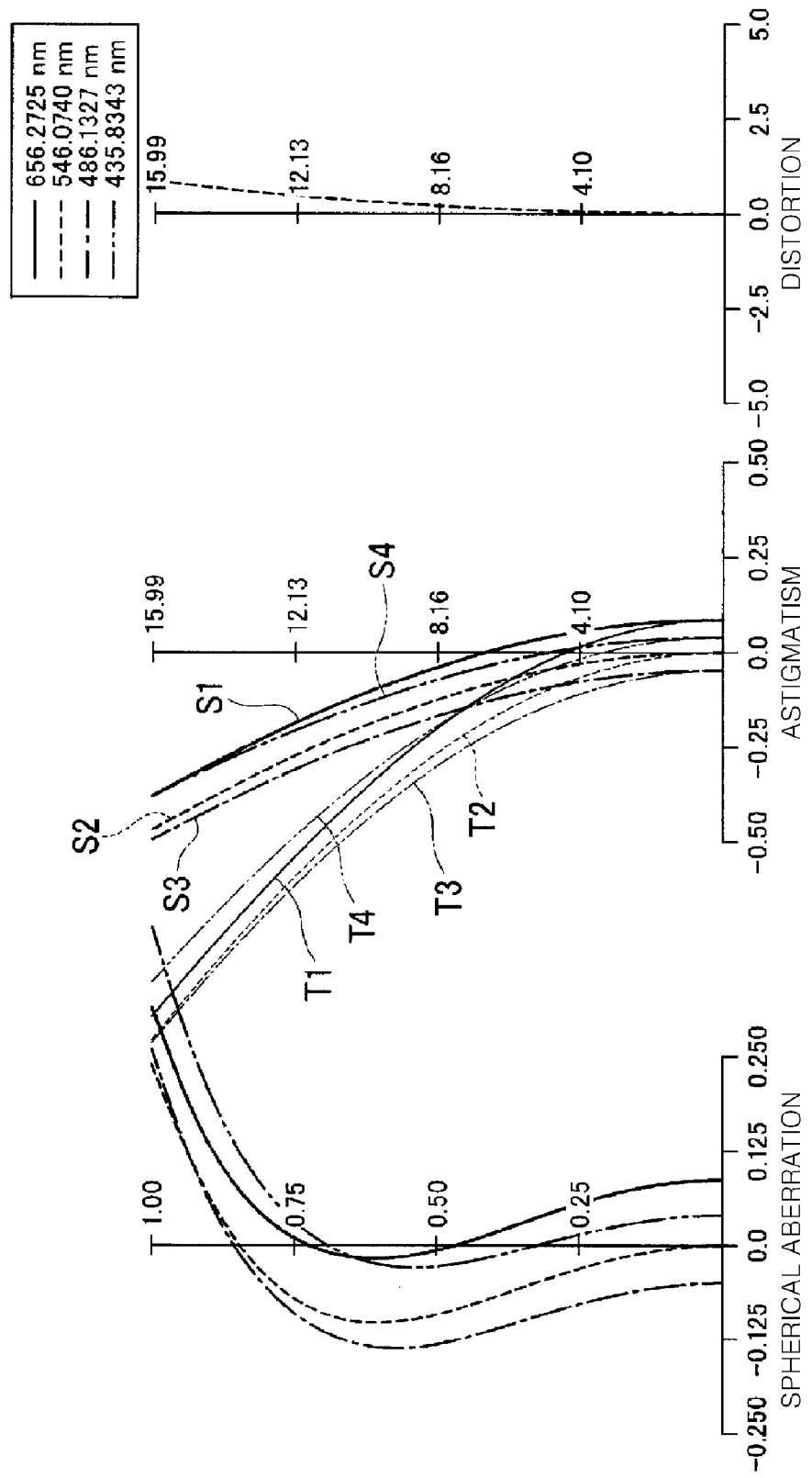
FIG. 15 shows an aberration diagram of the zoom lens according to Embodiment 2 when focused on an object at a minimum distance (0.45 m) at the telephoto position.

With respect to the zoom lens according to Embodiment 2, FIG. 10 shows an aberration diagram when focused on an object at infinite distance at the wide angle position, FIG. 11 shows an aberration diagram when focused on an object at a minimum distance (0.45 m) at the wide angle position, FIG. 12 shows an aberration diagram when focused on an object at infinite distance at the middle position, FIG. 13 shows an aberration diagram when focused on an object at a minimum distance (0.45 m) at the middle position, FIG. 14 shows an aberration diagram when focused on an object at infinite distance at the telephoto position, and FIG. 15 shows an aberration diagram when focused on an object at a minimum distance (0.45 m) at the telephoto position. FIGS. 10 to 15 are illustrated in the same manner as FIGS. 3 to 8.

Embodiment 3

FIG. 16 shows a zoom lens designed based on data according to Embodiment 3. The zoom lens shown in FIG. 16 has the same constitution as the zoom lens shown in FIG. 1, and lens data of the zoom lens is listed in Table 9 below.

TABLE 9

| Lens surface | R | D | nd | vd |
|---|---|---|---|---|
| S1 | 66.259 | 2.00 | 1.80518 | 25.43 |
| S2 | 39.809 | 4.93 | 1.69680 | 55.53 |
| S3 | 860.809 | D1 | | |
| S4 | 79.706 | 1.20 | 1.71300 | 53.87 |
| S5 | 10.645 | 6.40 | | |
| S6 | −51.940 | 1.10 | 1.67790 | 55.34 |
| S7 | 27.617 | 0.19 | | |
| S8 | 18.534 | 4.41 | 1.80518 | 25.43 |

TABLE 9-continued

| Lens surface | R | D | nd | vd |
|---|---|---|---|---|
| S9 | 82.504 | D2 | | |
| S10 | 132.150 | 1.80 | 1.67790 | 55.34 |
| S11 | −37.919 | D3 | | |
| S12 | stop | 0.10 | | |
| S13 | 13.288 | 3.43 | 1.51633 | 64.14 |
| S14 | −32.398 | 0.68 | 1.80518 | 25.43 |
| S15 | 59.635 | 3.27 | | |
| S16 | 122.239 | 2.59 | 1.80610 | 40.93 |
| S17 | −18.348 | 0.55 | 1.74320 | 49.34 |
| S18 | 50.261 | D4 | | |
| S19 | 30.419 | 3.32 | 1.58313 | 59.39 |
| S20 | −27.758 | 1.69 | | |
| S21 | −24.094 | 1.56 | 1.79952 | 42.22 |
| S22 | −402.408 | D5 | | |
| S23 | plane | 2.24 | 1.51633 | 64.14 |
| S24 | plane | 0.10 | | |

Variable distances during zooming from the wide angle position to the telephoto position are shown in Table 10 below.

TABLE 10

| Variable distance | Wide angle position (f = 18.55) | Middle position (f = 28.0) | Telephoto position (f = 53.4) |
|---|---|---|---|
| D1 | 1.847 | 12.000 | 25.328 |
| D2 | 15.874 | 8.822 | 2.026 |
| D3 | 2.510 | 2.769 | 3.820 |
| D4 | 5.708 | 4.541 | 3.362 |
| D5 | 21.070 | 29.455 | 45.509 |

Moving distance of the third lens group L3 for focusing when the object distance is 0.45 m are shown in Table 11 below.

TABLE 11

| Wide angle position | Middle position | Telephoto position |
|---|---|---|
| 1.817 | 2.270 | 3.319 |

Aspheric coefficients are shown in Table 12 below.

TABLE 12

| lens surface | R | K | A4 | A6 | A8 | A10 |
|---|---|---|---|---|---|---|
| S20 | −27.758 | 0.00000 | 7.56671E−05 | 3.60183E−07 | 0.00000 | 0.00000 |

Figure 17:
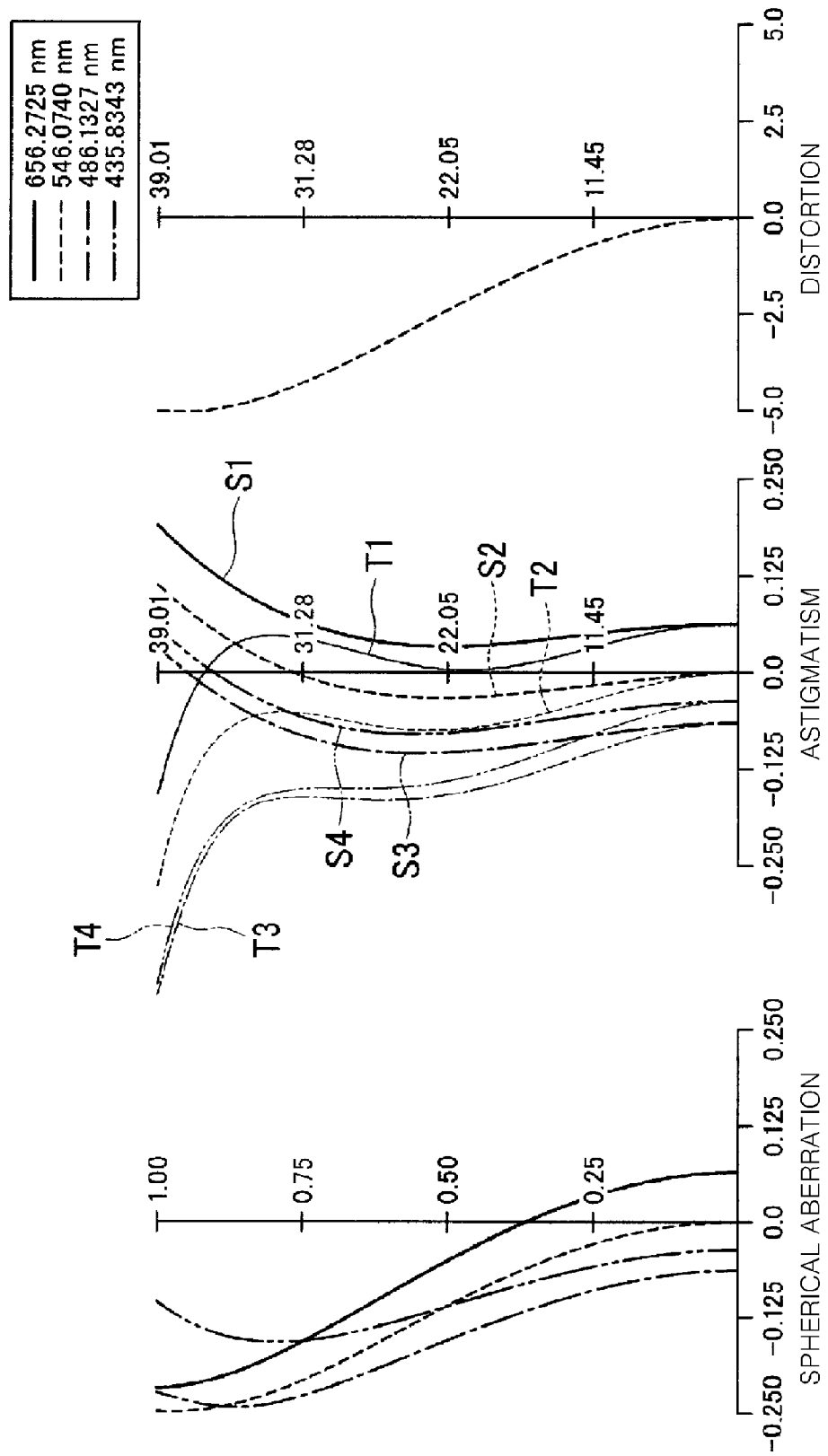
FIG. 17 shows an aberration diagram of the zoom lens according to Embodiment 3 when focused on an object at infinite distance at the wide angle position.
Figure 18:
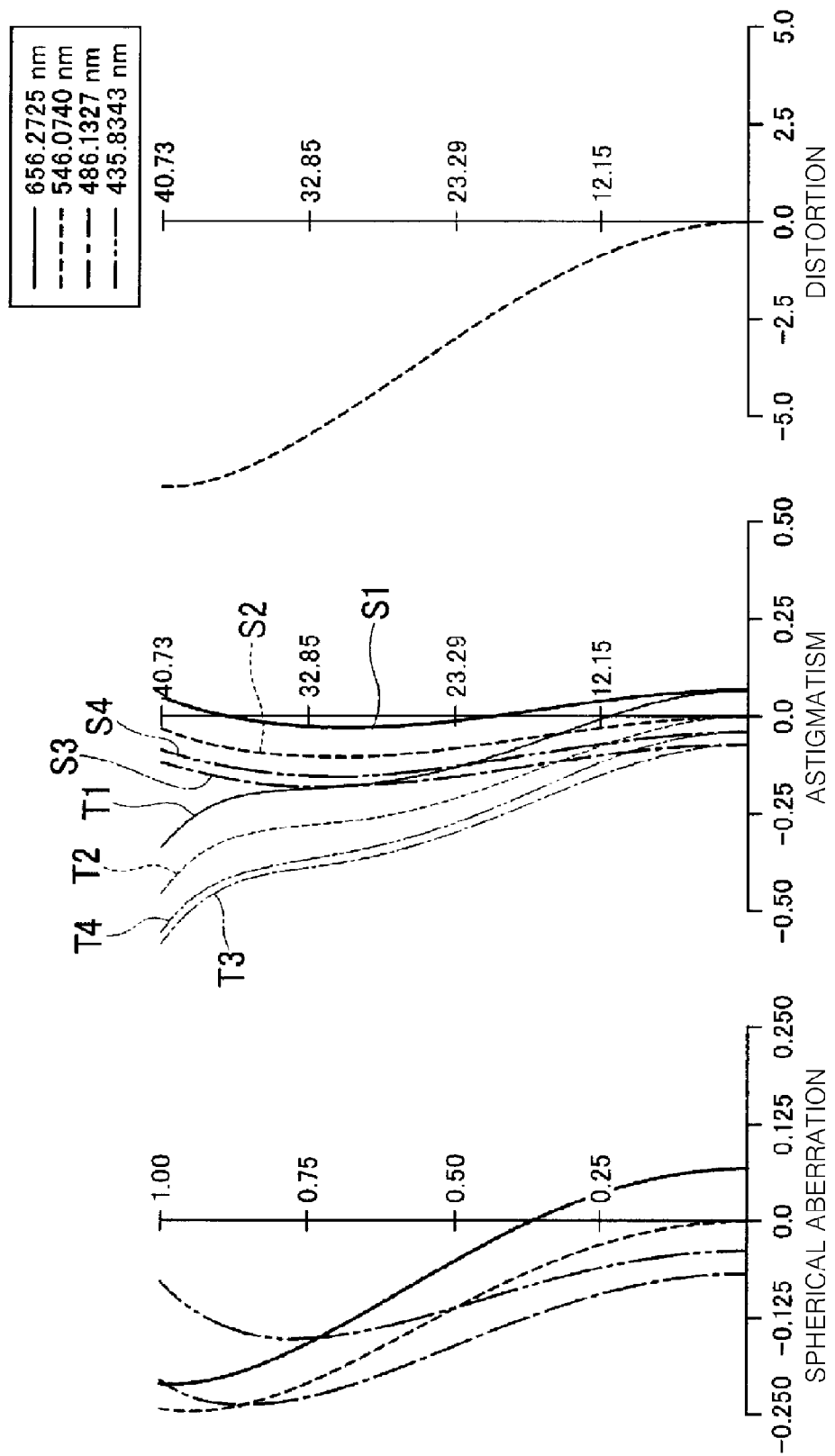
FIG. 18 shows an aberration diagram of the zoom lens according to Embodiment 3 when focused on an object at a minimum distance (0.45 m) at the wide angle position.
Figure 19:
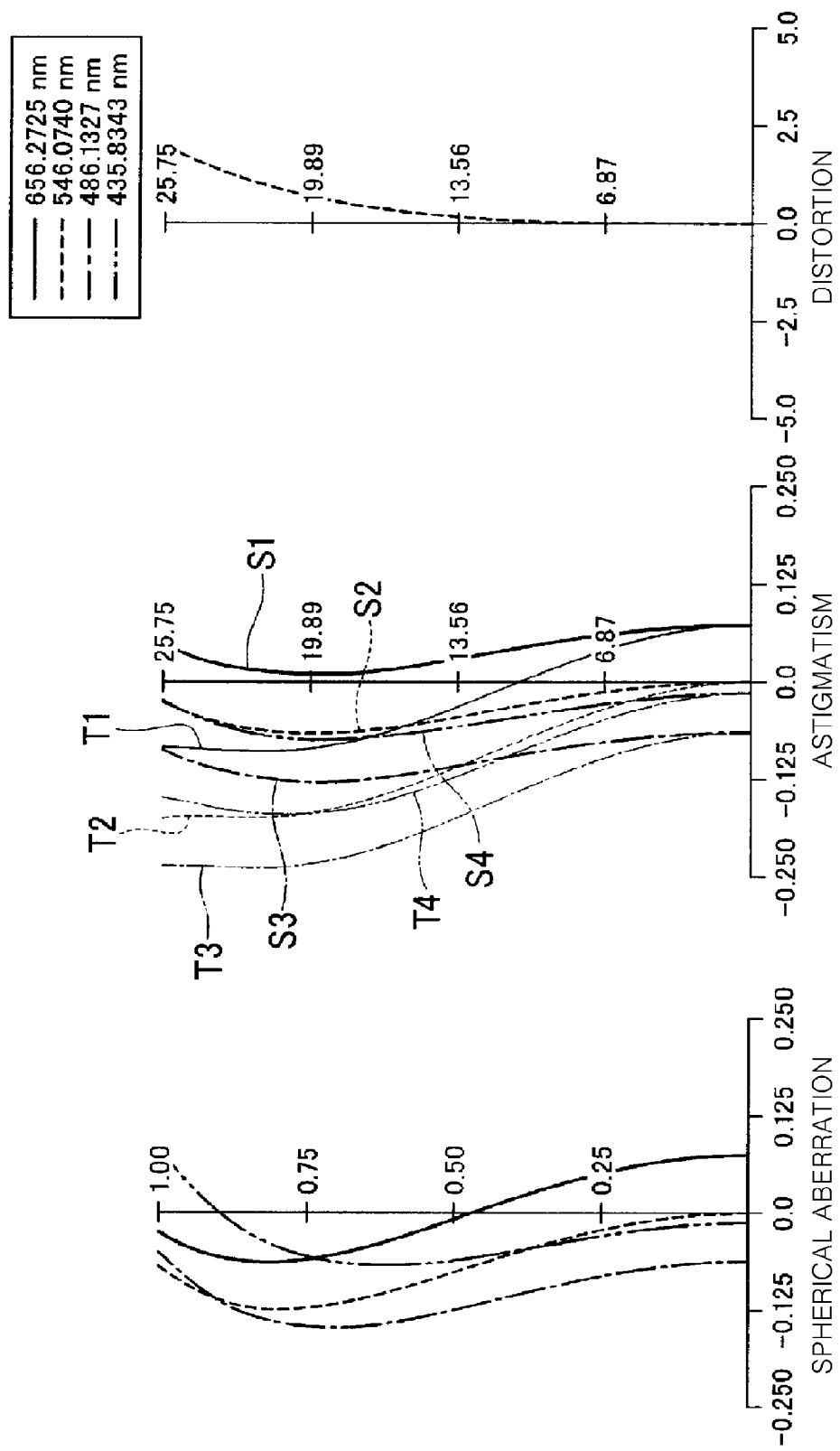
FIG. 19 shows an aberration diagram of the zoom lens according to Embodiment 3 when focused on an object at infinite distance at the middle position.
Figure 20:
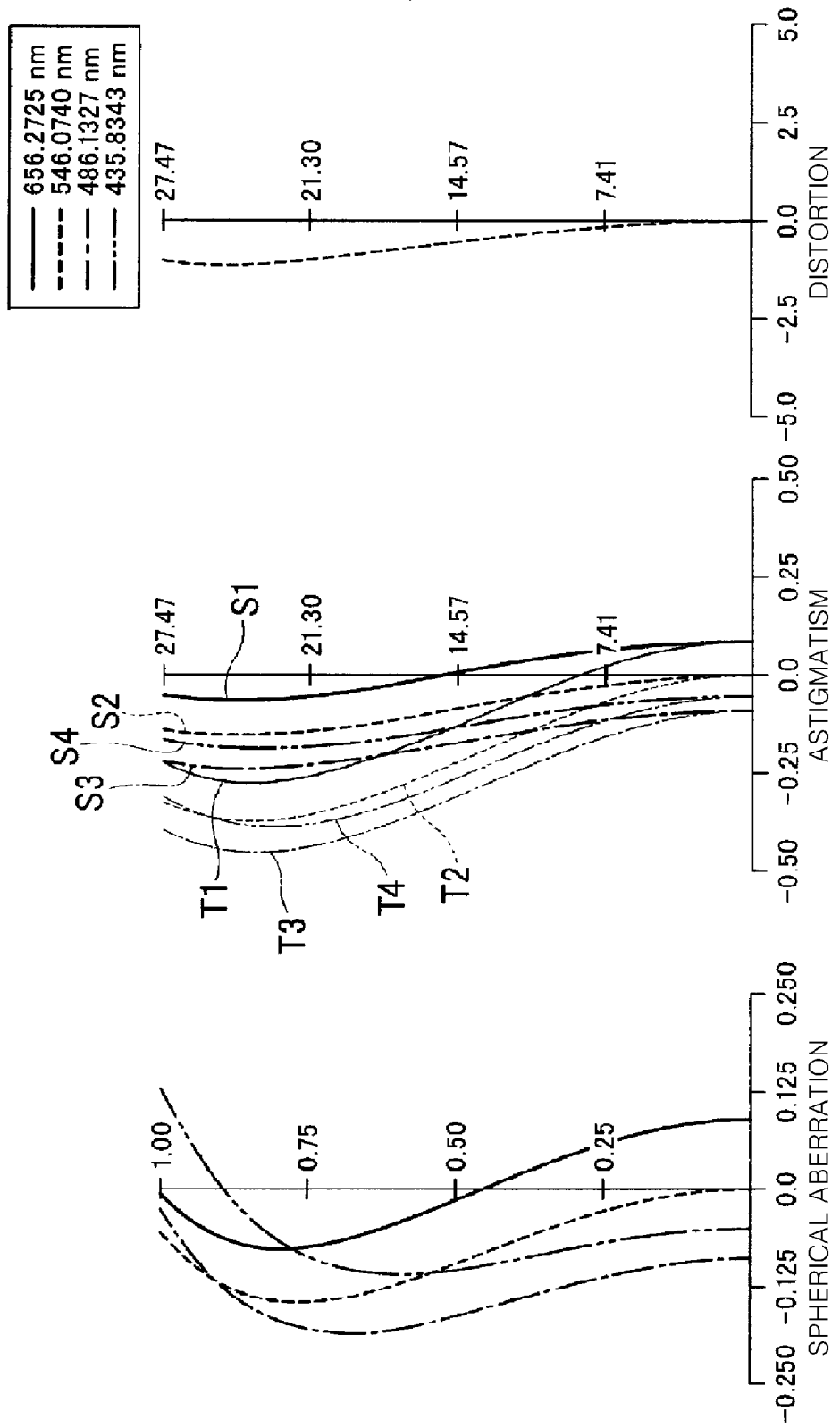
FIG. 20 shows an aberration diagram of the zoom lens according to Embodiment 3 when focused on an object at a minimum distance (0.45 m) at the middle position.
Figure 21:
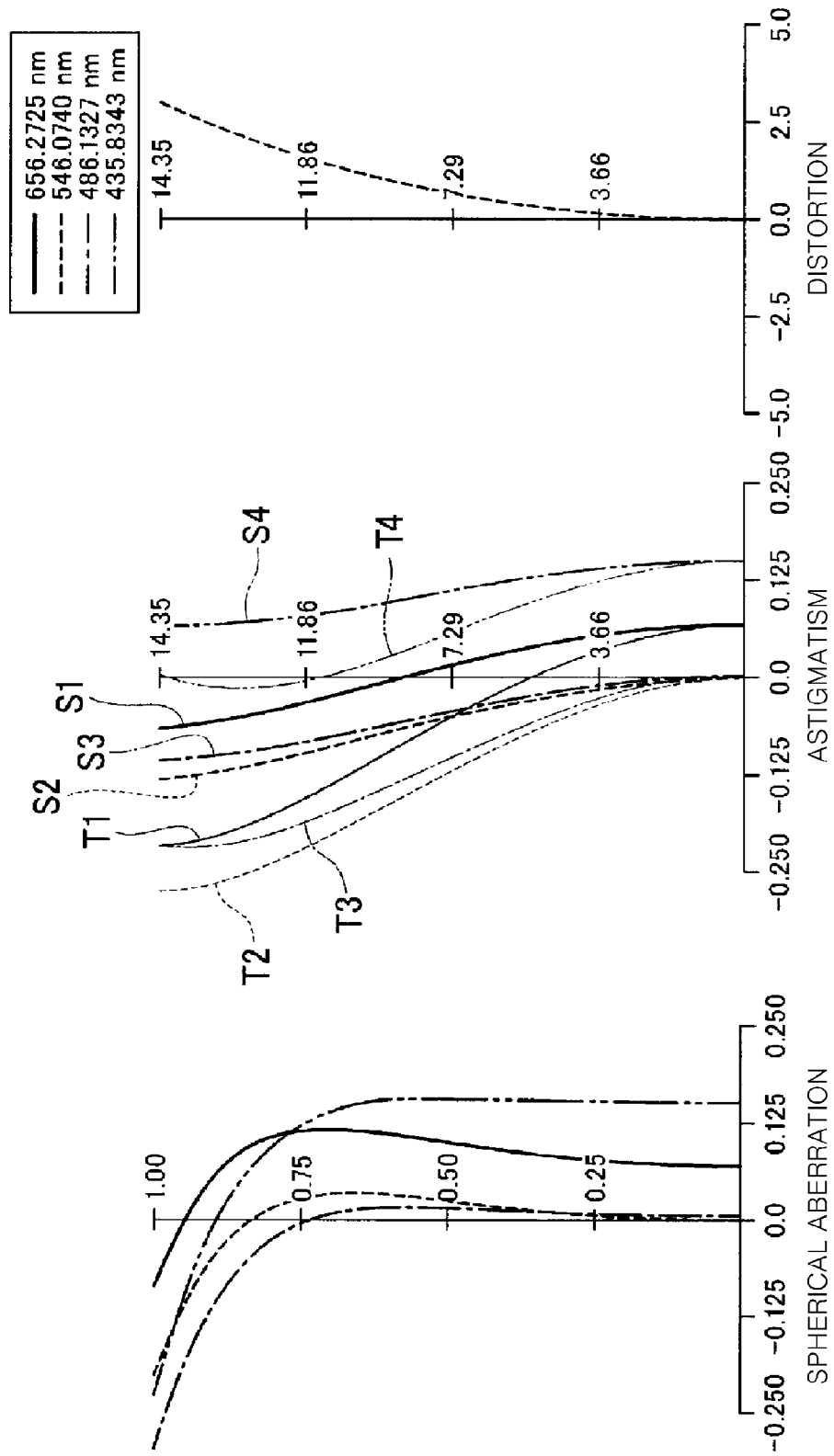
FIG. 21 shows an aberration diagram of the zoom lens according to Embodiment 3 when focused on an object at infinite distance at the telephoto position.
Figure 22:
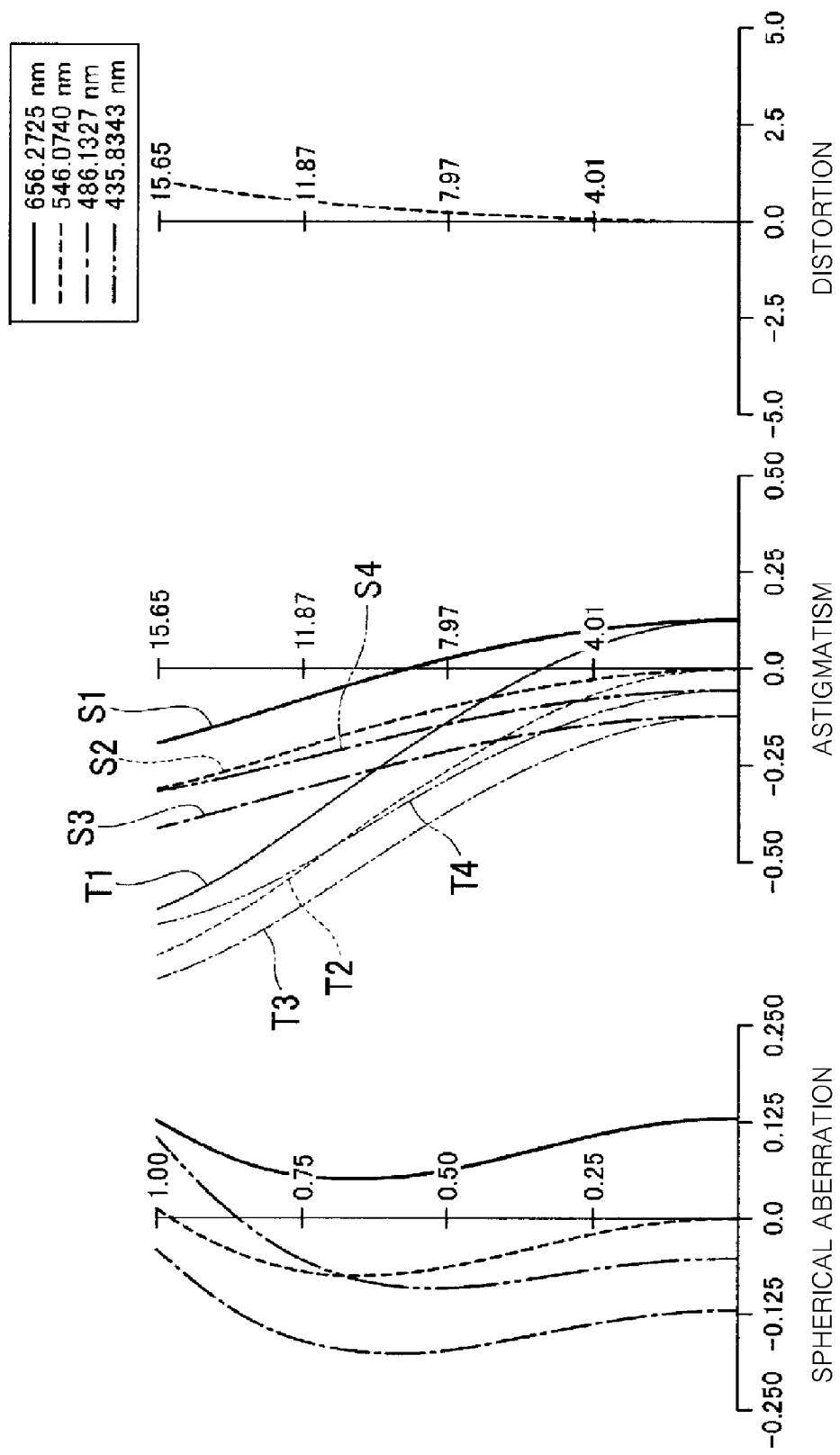
FIG. 22 shows an aberration diagram of the zoom lens according to Embodiment 3 when focused on an object at a minimum distance (0.45 m) at the telephoto position.

With respect to the zoom lens according to Embodiment 3, FIG. 17 shows an aberration diagram when focused on an object at infinite distance at the wide angle position, FIG. 18 shows an aberration diagram when focused on an object at a minimum distance (0.45 m) at the wide angle position, FIG. 19 shows an aberration diagram when focused on an object at infinite distance at the middle position, FIG. 20 shows an aberration diagram when focused on an object at a minimum distance (0.45 m) at the middle position, FIG. 21 shows an aberration diagram when focused on an object at infinite distance at the telephoto position, and FIG. 22 shows an aberration diagram when focused on an object at a minimum distance (0.45 m) at the telephoto position. FIGS. 17 to 22 are illustrated in the same manner as FIGS. 3 to 8.

Embodiment 4

FIG. 23 shows a zoom lens designed based on data according to Embodiment 4. A zoom lens according to Embodiment 4, which is different from the zoom lens shown in FIG. 1, includes: a first lens group L1 that includes a doublet lens having a negative meniscus lens 1 with a convex surface towards the object side and a positive lens 2 and a positive lens 3; a second lens group L2 that includes a negative meniscus lens 4 with a convex surface towards the object side, a biconcave lens 5, a positive lens 6 with a convex surface towards the object side, and a negative lens 7; a third lens group L3 that includes a doublet lens having a negative lens 8 and a positive lens 9; a fourth lens group L4 that includes a doublet lens having a positive lens 10 and a negative lens 11 and a doublet lens having a negative lens 12 and a positive lens 13; and a fifth lens group L5 that includes a positive lens 14, a doublet lens having a positive lens 15 and a negative lens 16, and a positive lens 17. A stop S may be disposed between the second lens group L2 and the third lens group L3, and an optical filter such as LPF may be disposed between the fifth lens group L5 and the image plane IP.

In the zoom lens according to Embodiment 4, each of the first to fifth lens groups L1 to L5 may be shifted towards the object side such that the axial distance between the first lens group L1 and the second lens group L2 increases and the axial distance between the second lens group L2 and the third lens group L3 decreases during zooming from the wide angle position to the telephoto position as shown in FIG. 23. In addition, the stop S may be integrally shifted with the fourth lens group L4 during zooming. In addition, as shown with an arrow F of FIG. 23, the third lens group L3 may be shifted towards the image side I to perform a focusing at the minimum distance. The doublet lens including the negative lens 12 and the positive lens 13 of the fourth lens group L4 may be shifted in a direction perpendicular to the optical axis to correct image shake caused by hand shaking.

Lens data for designing the zoom lens according to Embodiment 4 are listed in Table 13 below. Table 13 is listed in the same manner as in Table 1.

TABLE 13

| Lens surface | R | D | nd | vd |
|---|---|---|---|---|
| S1 | 147.109 | 2.00 | 1.80518 | 25.43 |
| S2 | 70.694 | 7.37 | 1.49700 | 81.55 |
| S3 | −371.921 | 0.12 | | |
| S4 | 60.382 | 6.07 | 1.63854 | 55.38 |
| S5 | 250.512 | D1 | | |
| S6 | 500.000 | 1.59 | 1.83481 | 42.71 |
| S7 | 15.515 | 5.87 | | |
| S8 | −29.927 | 1.33 | 1.80400 | 46.57 |
| S9 | 168.198 | 0.18 | | |
| S10 | 33.189 | 5.42 | 1.84666 | 23.78 |
| S11 | −25.122 | 0.53 | | |
| S12 | −20.683 | 1.21 | 1.83481 | 42.71 |
| S13 | 272.781 | D2 | | |
| S14 | stop | 0.50 | | |

TABLE 13-continued

| Lens surface | R | D | nd | vd |
|---|---|---|---|---|
| S15 | 52.106 | 0.85 | 1.80000 | 29.84 |
| S16 | 34.027 | 3.45 | 1.62299 | 58.17 |
| S17 | −30.895 | 8.26 | | |
| S18 | 17.757 | 4.07 | 1.48749 | 70.24 |
| S19 | −61.908 | 1.13 | 1.84666 | 23.78 |
| S20 | 81.373 | 3.11 | | |
| S21 | 248.488 | 1.10 | 1.80610 | 40.93 |
| S22 | 16.149 | 2.20 | 1.80518 | 25.43 |
| S23 | 25.026 | D4 | | |
| S24 | 50.994 | 5.10 | 1.67790 | 55.34 |
| S25 | −40.340 | 0.29 | | |
| S26 | 43.521 | 4.03 | 1.49700 | 81.55 |
| S27 | −139.478 | 1.66 | 1.83481 | 42.71 |
| S28 | 22.547 | 1.53 | | |
| S29 | 26.243 | 5.65 | 1.63980 | 34.47 |
| S30 | 109.903 | D5 | | |
| S31 | plane | 2.24 | | |
| S32 | plane | 0.60 | | |

Variable distances during zooming from the wide angle position to the telephoto position are shown in Table 14 below.

TABLE 14

| Variable distance | Wide angle position (f = 18.55) | Middle position (f = 69.0) | Telephoto position (f = 194.3) |
|---|---|---|---|
| D1 | 2.460 | 31.855 | 55.017 |
| D2 | 26.958 | 9.612 | 1.670 |
| D3 | 14.437 | 2.316 | 2.305 |
| D4 | 18.581 | 52.002 | 65.944 |

Moving distances of the third lens group L3 for focusing when the object distance is 0.45 m are shown in Table 15 below.

TABLE 15

| Wide angle position | Middle position | Telephoto position |
|---|---|---|
| 1.500 | 2.446 | 7.704 |

Aspheric coefficients are shown in Table 16 below.

TABLE 16

| Lens surface | R | K | A4 | A6 | A8 | A10 |
|---|---|---|---|---|---|---|
| S6 | 500.000 | 0.00000 | 1.97889E−06 | 3.56674E−09 | 3.05132E−11 | 0.00000E+00 |
| S17 | −30.895 | 0.00000 | 8.54454E−06 | 0.00000E+00 | 0.00000E+00 | 0.00000E+00 |
| S21 | 248.488 | 0.00000 | 7.53970E−06 | −2.04757E−08 | 0.00000E+00 | 0.00000E+00 |
| S24 | 50.994 | 0.00000 | −1.24767E−05 | −8.80785E−09 | 0.00000E+00 | 0.00000E+00 |

Figure 24:
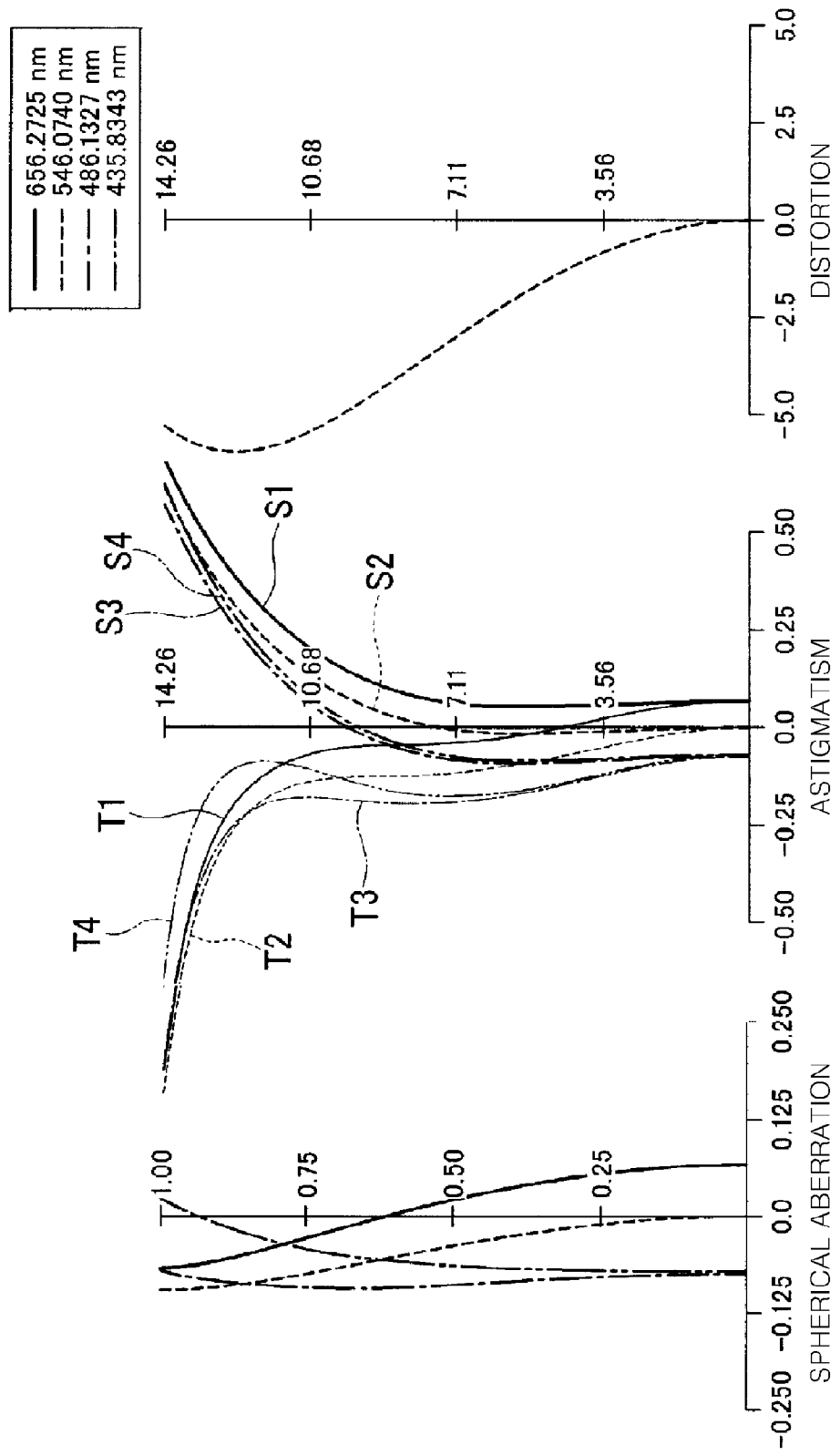
FIG. 24 shows an aberration diagram of the zoom lens according to Embodiment 4 when focused on an object at infinite distance at the wide angle position.
Figure 25:
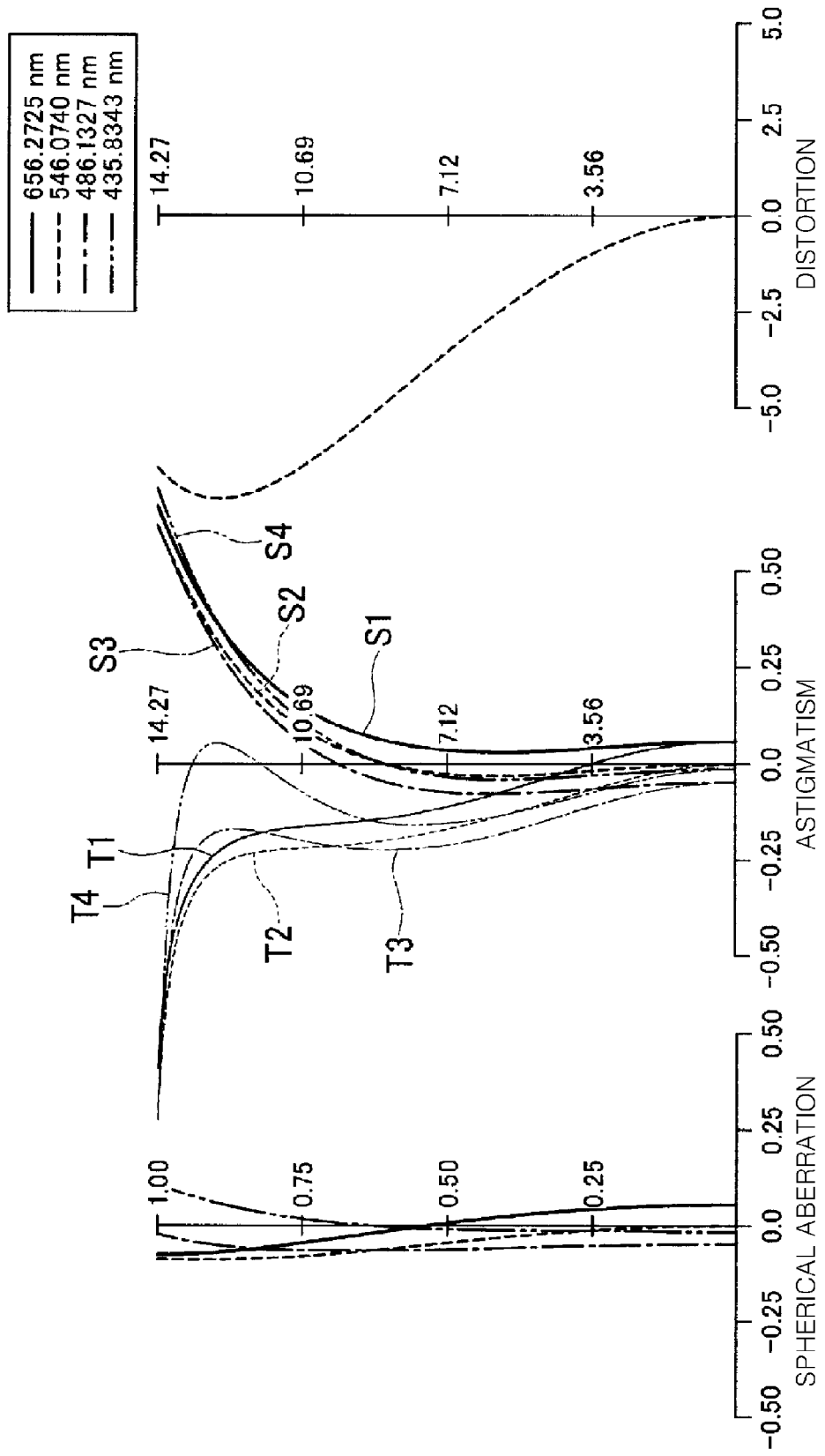
FIG. 25 shows an aberration diagram of the zoom lens according to Embodiment 4 when focused on an object at a minimum distance (0.45 m) at the wide angle position.
Figure 26:
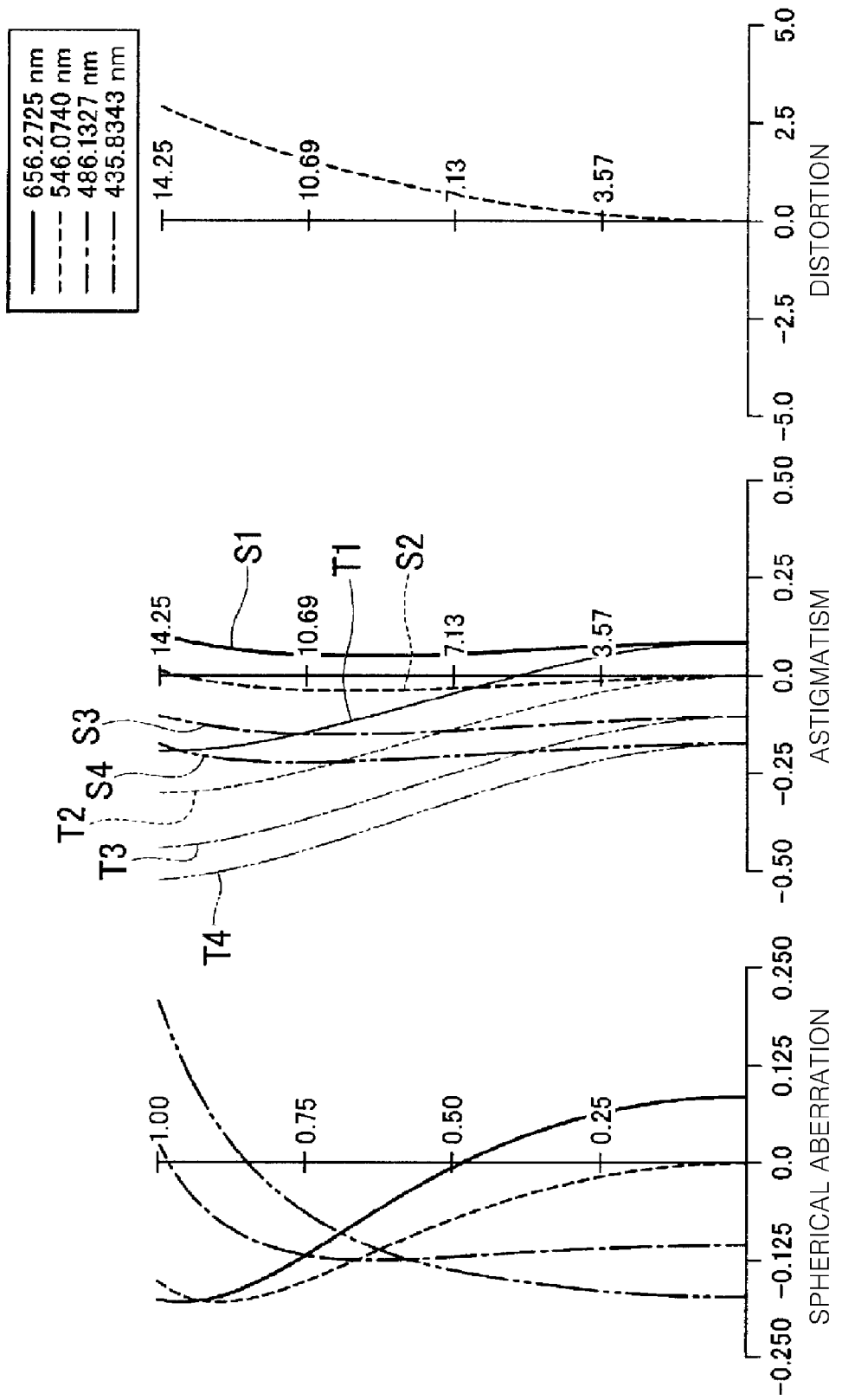
FIG. 26 shows an aberration diagram of the zoom lens according to Embodiment 4 when focused on an object at infinite distance at the middle position.
Figure 27:
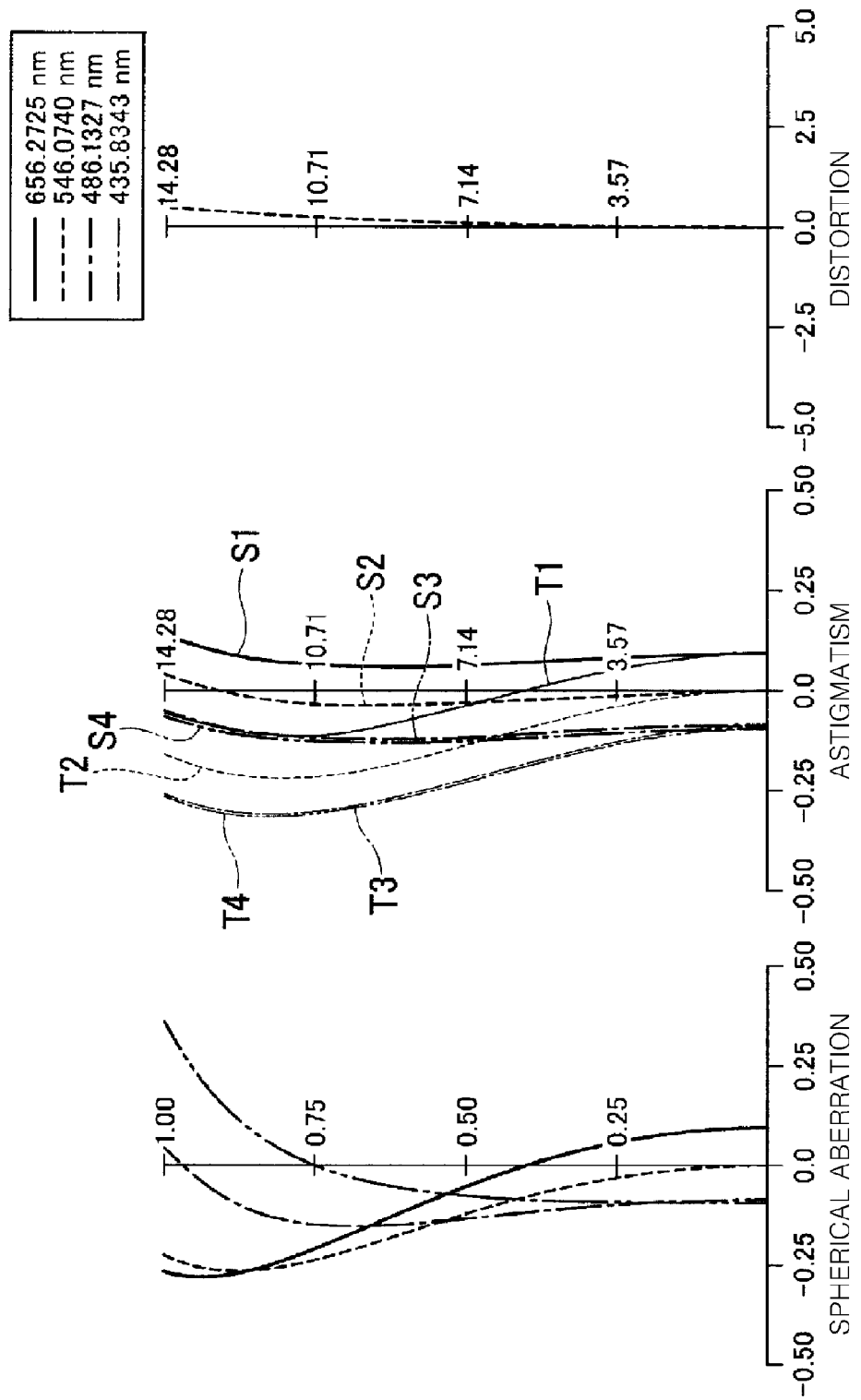
FIG. 27 shows an aberration diagram of the zoom lens according to Embodiment 4 when focused on an object at a minimum distance (0.45 m) at the middle position.
Figure 28:
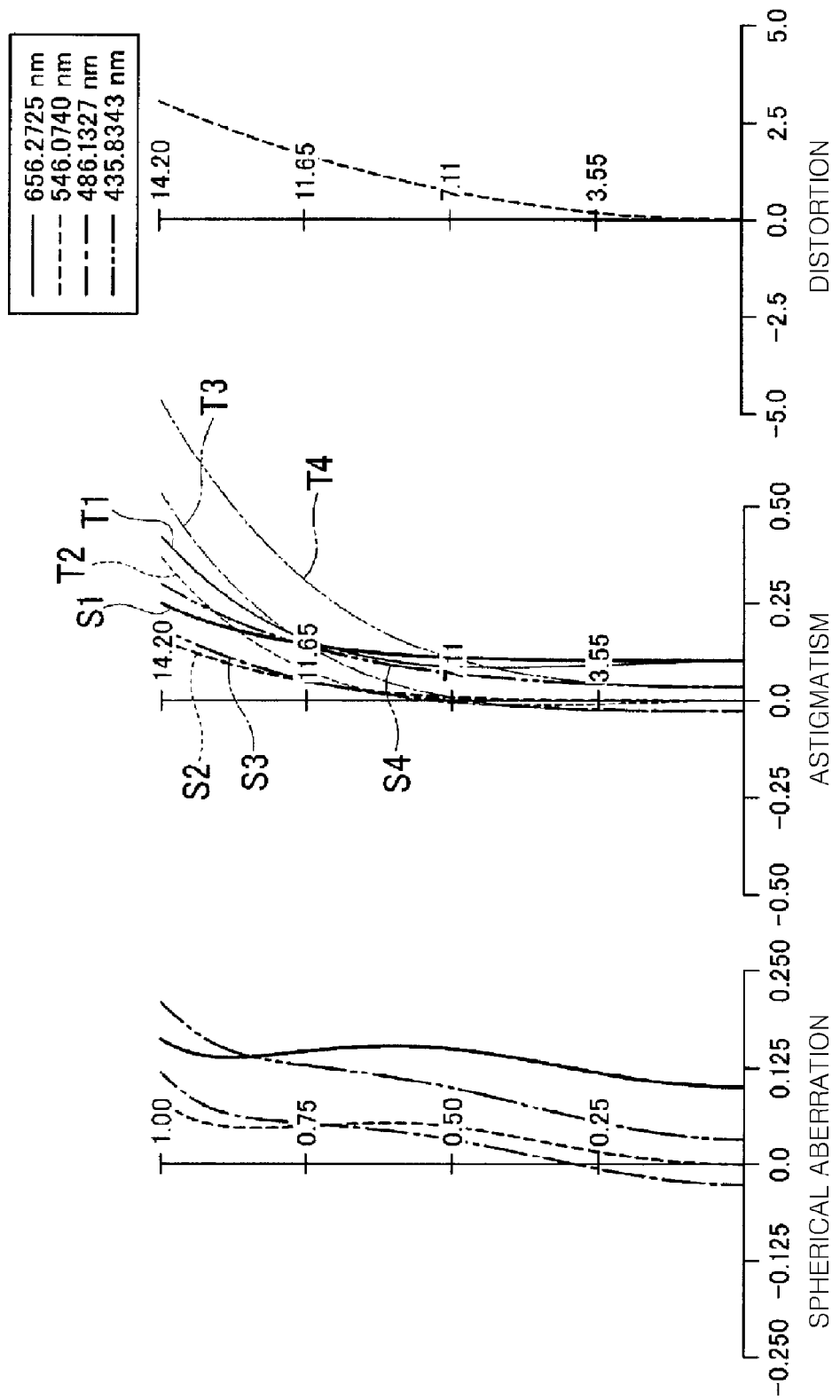
FIG. 28 shows an aberration diagram of the zoom lens according to Embodiment 4 when focused on an object at infinite distance at the telephoto position.
Figure 29:
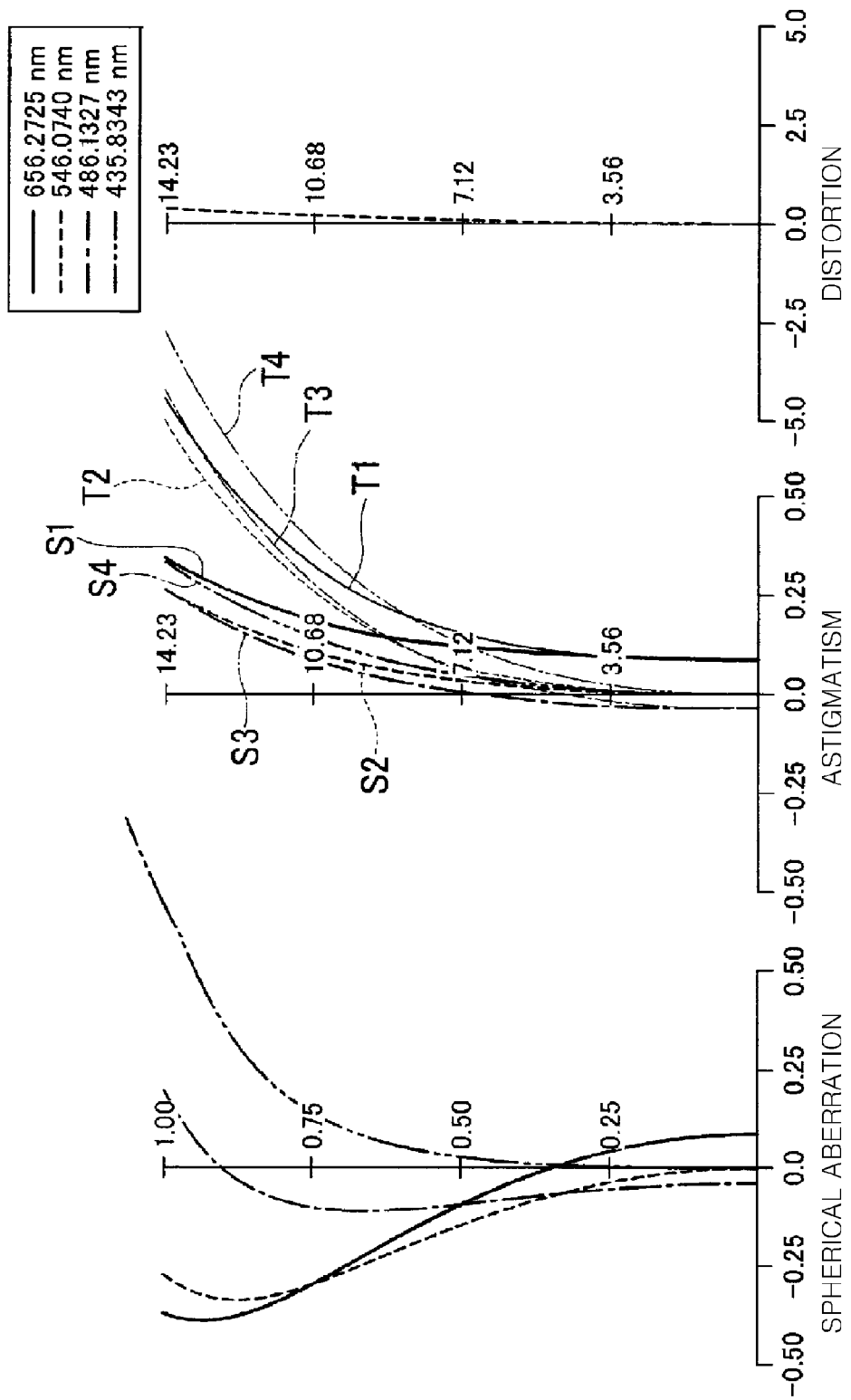
FIG. 29 shows an aberration diagram of the zoom lens according to Embodiment 4 when focused on an object at a minimum distance (0.45 m) at the telephoto position.

With respect to the zoom lens according to Embodiment 4, FIG. 24 shows an aberration diagram when focused on an object at infinite distance at the wide angle position, FIG. 25 shows an aberration diagram when focused on an object at a minimum distance (0.45 m) at the wide angle position, FIG. 26 shows an aberration diagram when focused on an object at infinite distance at the middle position, FIG. 27 shows an aberration diagram when focused on an object at a minimum distance (0.45 m) at the middle position, FIG. 28 shows an aberration diagram when focused on an object at infinite distance at the telephoto position, and FIG. 29 shows an aberration diagram when focused on an object at a minimum distance (0.45 m) at the telephoto position. FIGS. 25 to 29 are illustrated in the same manner as FIGS. 3 to 8.

According to the following data, it can be seen that the zoom lens according to embodiments of the invention satisfies Formulae 1 to 19.

TABLE 17

| Formula | Embodiment 1 | Embodiment 2 | Embodiment 3 | Embodiment 4 |
|---|---|---|---|---|
| $f_3/f_{rt}$ | 0.689 | 0.724 | 1.068 | 0.283 |
| $|f_3/f_2|$ | 2.333 | 2.387 | 2.748 | 2.476 |
| $|1 - \beta_{3t}^2 \times \beta_{xt}^2|$ | 3.700 | 3.700 | 3.686 | 7.503 |
| $1 - \beta_{3w}^2 \times \beta_{xw}^2 / 1 - \beta_{3t}^2 \times \beta_{xt}^2$ | 22.198 | 15.352 | 3.332 | 21.090 |
| $|f_1/(f_w \times f_t)^{1/2}|$ | 3.209 | 3.210 | 3.636 | 1.585 |
| $|f_2/(f_w \times f_t)^{1/2}|$ | 0.470 | 0.473 | 0.502 | 0.226 |
| $|f_{rt}/(f_w \times f_t)^{1/2}|$ | 1.592 | 1.557 | 1.291 | 1.976 |

As described above, the zoom lens according to the invention has high zoom magnification and excellent optical performance from the wide angle position to the telephoto position. In addition the zoom lens has excellent focusing performance at the minimum distance. Furthermore, the zoom lens may be suitably applied to an auto-focusing control by bokeh sensing of the imaging device.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising:
a first lens group having a positive refractive power, a second lens group having a negative refractive power, a third lens group having a positive refractive power, a fourth lens group having a negative refractive power, and a fifth lens group having a positive refractive power, which are sequentially arranged from an object side,
wherein when an effective focal length of the third lens group is $f_3$[mm], an effective focal length of the third to fifth lens groups at the telephoto position is $f_{rt}$[mm], and an effective focal length of the second lens group is $f_2$[mm], the zoom lens satisfies the additional formulae:

$0.1 < f_3/f_{rt} < 2.0$, $1.5 < |f_3/f_2| < 4.0$     Formulae.

2. The zoom lens of claim 1, wherein a distance between the first lens group and the second lens group increases and a distance between the second lens group and the third lens group decreases during zooming from the wide angle position to the telephoto position.

3. The zoom lens of claim 1, wherein the third lens group is shifted towards an image side to perform a focusing at a minimum distance.

4. The zoom lens of claim 1, wherein the third lens group comprises one piece of positive lens.

5. The zoom lens of claim 1, wherein when a transverse magnification of the third lens group when focused on an object at infinite distance at the telephoto position is $\beta_{3t}$, and a transverse magnification of a lens group that is disposed closer to the image side than the third lens group and focused on an object at infinite distance at the telephoto position is $\beta_{xt}$, the zoom lens satisfies the additional formula:

$$|(1-\beta_{3t}^2) \times \beta_{xt}^2| > 2.0 \qquad \text{Formula.}$$

6. The zoom lens of claim 1, wherein when a transverse magnification of the third lens group when focused on an object at infinite distance at the wide angle position is $\beta_{3w}$, and a transverse magnification of a lens group that is disposed closer to the image side than the third lens group and focused on an object at infinite distance at the telephoto position is $\beta_{xw}$, the zoom lens satisfies the additional formula:

$$\{(1-\beta_{3w}^2) \times \beta_{xw}^2\} / \{(1-\beta_{3t}^2) \times \beta_{xt}^2\} > 0 \qquad \text{Formula.}$$

7. The zoom lens of claim 1, wherein when an effective focal length of the first lens group is $f_1$[mm], an effective focal length of the second lens group is $f_2$[mm], a total focal length of the zoom lens at the wide angle position is $f_w$[mm], and a total focal length of the zoom lens at the telephoto position is $f_t$[mm], the zoom lens satisfies the additional formulae:

$$1.0 < |f_1/(f_w \times f_t)^{1/2}| < 5.0,$$

$$0.1 < |f_2/(f_w \times f_t)^{1/2}| < 1.0,$$

$$0.5 < |f_{rt}/(f_w \times f_t)^{1/2}| < 3.0 \qquad \text{Formulae.}$$

8. The zoom lens of claim 1, wherein the distance between the fourth lens group and the fifth lens group varies during zooming.

9. The zoom lens of claim 1, wherein the first lens group comprises:
   a negative meniscus lens with a convex surface towards the object side; and
   a positive lens.

10. The zoom lens of claim 1, wherein the second lens group comprises:
    a negative meniscus lens with a convex surface towards the object side;
    a biconcave lens; and
    a positive lens with a convex surface towards the object side.

11. The zoom lens of claim 1, wherein the third lens group comprises a biconvex lens.

12. The zoom lens of claim 1, wherein the fourth lens group comprises:
    a first doublet lens having a positive lens and a negative lens; and
    a second doublet lens having a positive lens and a negative lens.

13. The zoom lens of claim 1, wherein the fifth lens group comprises a positive lens and a negative lens.

14. The zoom lens of claim 1, wherein the first lens group comprises:
    a doublet lens having a negative meniscus lens with a convex surface towards the object side and a positive lens; and
    a positive lens.

15. The zoom lens of claim 1, wherein the third lens group comprises a doublet lens having a negative lens and a positive lens.

16. The zoom lens of claim 1, wherein the fifth lens group comprises:
    a positive lens;
    a doublet lens having a positive lens and a negative lens; and
    a positive lens.

17. A photographing apparatus comprising:
    a zoom lens; and
    an imaging device that picks up an image formed by the zoom lens,
    wherein the zoom lens comprises:
        a first lens group having a positive refractive power, a second lens group having a negative refractive power, and a third lens group having a positive refractive power, a fourth lens group having a negative refractive power, and a fifth lens group having a positive refractive power, which are sequentially arranged from an object side,
    wherein when an effective focal length of the third lens group is $f_3$[mm], and an effective focal length of the additional lens grouping at the telephoto position is $f_{rt}$[mm], and an effective focal length of the second lens group is $f_2$[mm], the zoom lens satisfies the additional formulae:

$$0.1 < f_3/f_{rt} < 2.0,$$

$$1.5 < |f_3/f_2| < 4.0 \qquad \text{Formulae.}$$

* * * * *